US 6,728,551 B2

(12) United States Patent
Chang

(10) Patent No.: US 6,728,551 B2
(45) Date of Patent: Apr. 27, 2004

(54) METHOD OF SUPPORTING POWER CONTROL ON A DCCH IN A BASE STATION TRANSCEIVER SYSTEM AND A BASE STATION CONTROLLER

(75) Inventor: Yong Chang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 490 days.

(21) Appl. No.: 09/843,506

(22) Filed: Apr. 26, 2001

(65) Prior Publication Data
US 2002/0012326 A1 Jan. 31, 2002

(30) Foreign Application Priority Data

Apr. 26, 2000 (KR) ........................................ 2000-22183

(51) Int. Cl.⁷ ............................................... H04B 7/00
(52) U.S. Cl. ......................... 455/522; 455/69; 370/318
(58) Field of Search ............................. 455/522, 69, 68, 455/70, 453, 524, 561; 370/328, 252, 335, 342, 337, 329, 318

(56) References Cited

U.S. PATENT DOCUMENTS

| | | | | |
|---|---|---|---|---|
| 5,920,823 A | * | 7/1999 | Murai ......................... | 455/522 |
| 6,026,279 A | * | 2/2000 | Nakamura et al. ............ | 455/69 |
| 6,148,208 A | * | 11/2000 | Love ........................... | 455/442 |
| 6,442,152 B1 | * | 8/2002 | Park et al. ................... | 370/341 |
| 6,493,564 B2 | * | 12/2002 | Longoni et al. ............. | 455/522 |
| 6,587,447 B1 | * | 7/2003 | Wang et al. ................. | 370/335 |
| 6,590,874 B1 | * | 7/2003 | Wang et al. ................. | 370/318 |
| 6,639,908 B1 | * | 10/2003 | Silventoinen et al. ........ | 370/345 |
| 6,654,613 B1 | * | 11/2003 | Maeng et al. ................ | 455/522 |
| 2001/0040880 A1 | * | 11/2001 | Chen et al. .................. | 370/337 |
| 2002/0019245 A1 | * | 2/2002 | Longoni et al. ............. | 455/522 |
| 2003/0026242 A1 | * | 2/2003 | Jokinen et al. .............. | 370/350 |

FOREIGN PATENT DOCUMENTS

| | | |
|---|---|---|
| WO | WO 98/36508 | 8/1998 |
| WO | WO 98/56120 | 12/1998 |
| WO | WO 98/58461 | 12/1998 |

\* cited by examiner

Primary Examiner—Nay Maung
Assistant Examiner—Tan Trinh
(74) Attorney, Agent, or Firm—Dilworth & Barrese LLP

(57) ABSTRACT

There is provided a method of transmitting power control information to a BSC (Base Station Controller) in a BTS (Base station Transceiver System) of a mobile communication system. The BTS receives forward power control (FPC) mode information indicating a low power control from the BSC and transmits the FPC mode information to an MS (Mobile Station). Then, the BTS extracts a QIB (Quality Indicator Bit) that is a power control command in a frame period from a reverse pilot channel received from the MS according to the FPC mode information and determines the status of the QIB. The BTS transmits information requesting the BSC to change a threshold for a power control on a forward DCCH (Dedicated Control Channel) based on the determined QIB status to the BSC.

15 Claims, 25 Drawing Sheets

FIG. 7
(PRIOR ART)

| INFORMATION ELEMENT | ELEMENT DIRECTION | TYPE |
|---|---|---|
| MESSAGE TYPE | SDU → BTS | M |
| FORWARD LAYER 3 IS-2000 FCH/DCCH DATA | SDU → BTS | M |
| MESSAGE CRC | SDU → BTS | M |

FIG. 8
(PRIOR ART)

| 7 | 6 | 5 | 4 | 3 | 2 | 1 | 0 | Octet |
|---|---|---|---|---|---|---|---|---|
| MESSAGE TYPE II = [0EH] | | | | | | | | 1 |
| FORWARD LAYER 3 IS-2000 FCH/DCCH DATA {1: | | | | | | | | |
| FPC: SLC = [0001 TO 0110] | | | | FSN = [0000 TO 1111] | | | | 1 |
| FPC: GR = [00H – FFH] | | | | | | | | 2 |
| RPC: OLT = [00H – FFH] | | | | | | | | 3 |
| IS-2000 FRAME CONTENT = [00H, 20H, 21H, 7FH] | | | | | | | | 4 |
| (MSB) | | | | | | | | 5 |
| FORWARD LINK INFORMATION = <VARIABLE> | | | | | | | | |
| | | | | | | | (LSB) | n |
| } FORWARD LAYER 3 IS-2000 FCH/DCCH DATA | | | | | | | | |
| (MSB) | | | | MESSAGE CRC = [0000H–FFFFH] | | | | 1 |
| | | | | | | | (LSB) | 2 |

FIG. 9
(PRIOR ART)

| INFORMATION ELEMENT | ELEMENT DIRECTION | TYPE |
|---|---|---|
| MESSAGE TYPE | SDU ↔ BTS | M |
| REVERSE LAYER 3 IS-2000 FCH/DCCH DATA | SDU ↔ BTS | M |
| MESSAGE CRC | SDU ↔ BTS | M |

FIG. 10 (PRIOR ART)

| 7 | 6 | 5 | 4 | 3 | 2 | 1 | 0 | Octet |
|---|---|---|---|---|---|---|---|---|
| \multicolumn{8}{c\|}{MESSAGE TYPE II = [0EH]} | 1 |
| \multicolumn{8}{c\|}{REVERSE LAYER 3 IS-2000 FCH/DCCH DATA {1:} | |
| SOFT HANDOFF LEG # = [000 - 1111] | | | | FSN = [000 to 1111] | | | | 1 |
| CRC =[0,1] | | REVERSE LINK QUALITY = [000 0000 111 1111] | | | | | | 2 |
| SCALING =[00 11] | | PACKET ARRIVAL TIME ERROR =[00 0000 11 1111] | | | | | | 3 |
| IS-2000 FRAME CONTENT = [00H, 20H, 21H, 7EH, 7FH] | | | | | | | | 4 |
| FPC: SNR = [0000 000 1111 111] | | | | | | | EIB =[0,1] | 5 |
| | | | | | | | | 6 |
| (MSB) | | | REVERSE LINK INFORMATION = <VARIABLE> | | | | (LSB) | n |
| } REVERSE LAYER 3 IS-2000 FCH/DCCH DATA | | | | | | | | |
| (MSB) | | | MESSAGE CRC = [0000H-FFFFH] | | | | (LSB) | 1 |
| | | | | | | | | 2 |

FIG. 12

| INFORMATION ELEMENT | ELEMENT DIRECTION | TYPE |
|---|---|---|
| MESSAGE TYPE II | SDU ↔ BTS | M |
| REVERSE LAYER 3 IS-2000 FCH/DCCH DATA | SDU ↔ BTS | M |
| MESSAGE CRC | SDU ↔ BTS | M |

FIG. 13

| 7 | 6 | 5 | 4 | 3 | 2 | 1 | 0 | Octet |
|---|---|---|---|---|---|---|---|---|
| MESSAGE TYPE II = [OEH] | | | | | | | | 1 |
| REVERSE LAYER 3 IS-2000 FCH/DCCH DATA {}: | | | | | | | | |
| SOFT HANDOFF LEG # = [0000 – 1111] | | | | FSN = [0000 to 1111] | | | | 1 |
| FQI = [0,1] | SCALING = [00 11] | | REVERSE LINK QUALITY = [000 0000 111 1111] | | | | | 2 |
| PACKET ARRIVAL TIME ERROR = [00 0000 11 1111] | | | | | | | | 3 |
| IS-2000 FRAME CONTENT = [00H, 20H, 21H, 7EH, 7FH] | | | | | | | | 4 |
| FPC: SNR = [0000 000 1111 111] | | | | | | | QIB/EIB = [0,1] | 5 |
| (MSB) REVERSE LINK INFORMATION = <VARIABLE> | | | | | | | | 6 |
| | | | | | | | (LSB) | n |
| } REVERSE LAYER 3 IS-2000 FCH/DCCH DATA | | | | | | | | |
| (MSB) MESSAGE CRC = [0000H–FFFFH] | | | | | | | | 1 |
| | | | | | | | (LSB) | 2 |

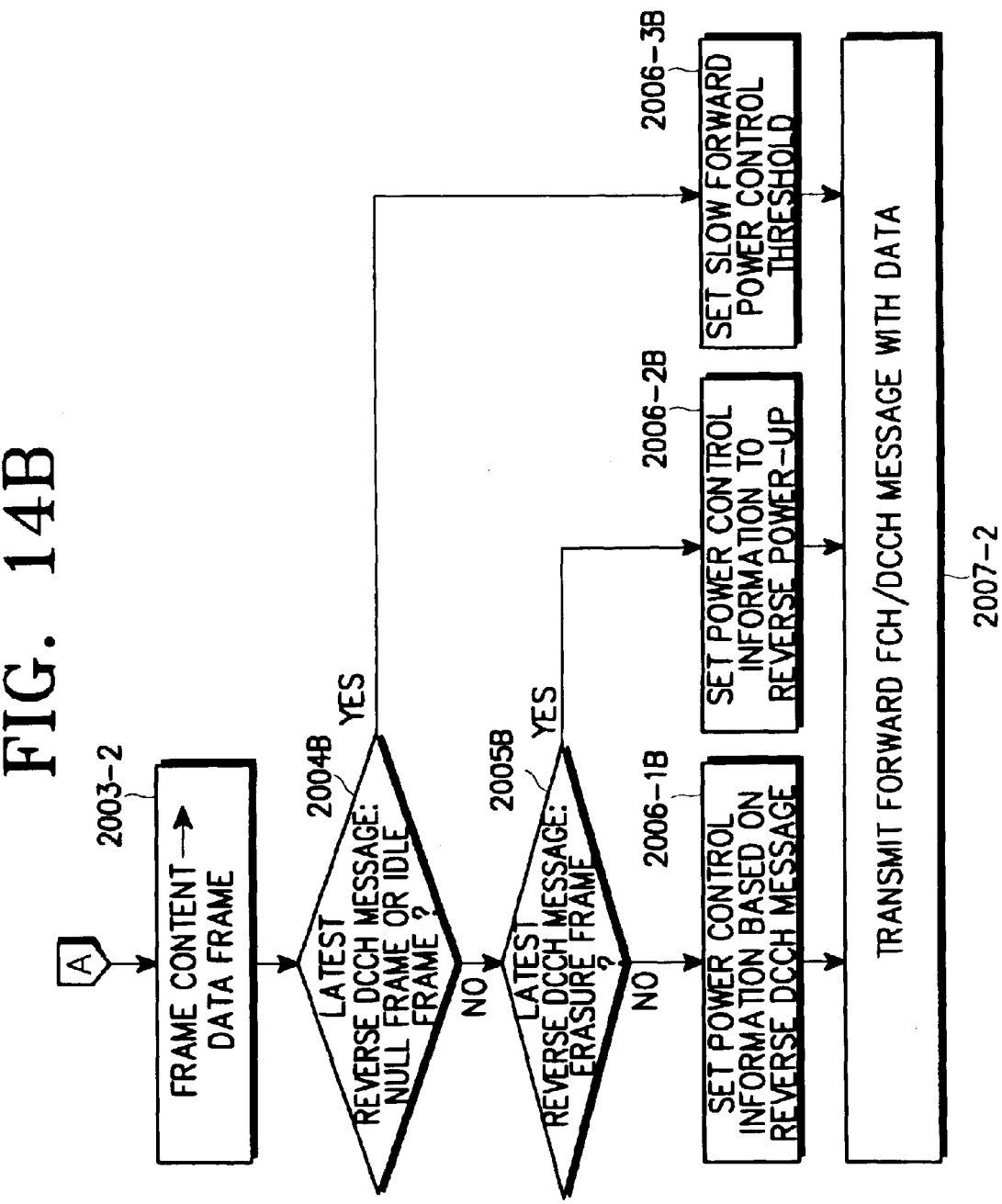

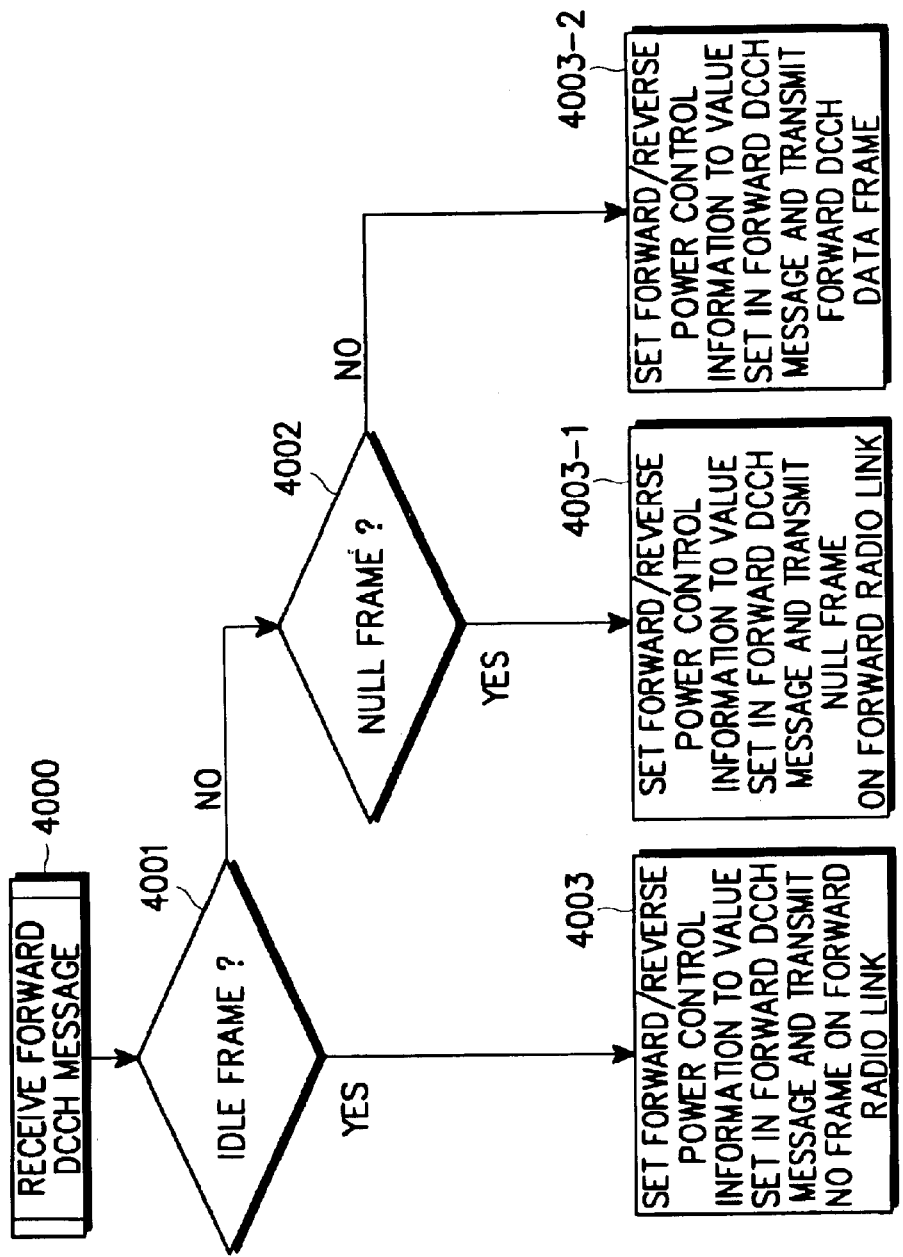

METHOD OF SUPPORTING POWER CONTROL ON A DCCH IN A BASE STATION TRANSCEIVER SYSTEM AND A BASE STATION CONTROLLER

PRIORITY

This application claims priority to an application entitled "Method of Supporting Power Control on DCCH in BS" filed in the Korean Industrial Property Office on Apr. 26, 2000 and assigned Ser. No. 2000-22183; the contents of which are hereby incorporated by reference.

BACKGROUND OF THE INVENTION

1. Field of the Invention

The present invention relates generally to a CDMA (Code Division Multiple Access) mobile communication system, and in particular, to an apparatus and method for supporting forward and reverse power control on a DCCH (Dedicated Control Channel) in a BTS (Base station Transceiver System) and a BSC (Base Station Controller).

2. Description of the Related Art

A discontinuous transmission (DTX) mode refers to a mode in which data is transmitted in frames only when transmission data is generated in a wired system or a mobile communication system. Data transmission in the DTX mode minimizes transmission power and increases the whole system capacity due to the decrease of interference with the system.

The DTX, however, exhibits a problem when a receiver does not know whether frames have been transmitted or not because a transmitter transmits frames irregularly. That makes it impossible for a BTS to perform a forward power control. More specifically, when a receiver in a mobile station (MS) cannot make a right judgment about data transmission, it does not rely on decoder decision parameters including CRC (Cyclic Redundancy Code) and decoding results. Hence, the transmission power of the MS cannot be controlled accurately by known methods suitable for a continuous transmission mode.

Both a DCCH and an SCH (Supplemental Channel) support the DTX mode. The DCCH is characterized by data transmission only when transmission data is generated in a higher layer, which makes the DCCH suitable as a control channel for efficient packet services. The DCCH is supposed to transmit null frames for power control during the DTX period. The SCH supports a DTX mode in which no data is transmitted in the absence of transmission data. The SCH transmits no frames during the DTX period.

FIG. 1 is a block diagram of a prior art mobile communication system. The mobile communication system is a reference model of 3G IOS (Interoperability Specifications) with an MSC (Mobile Switching Center), BSs (Base Stations), and a digital air interface between the BSs, which are well known.

Referring to FIG. 1, an interface A1 is defined for signaling and interfaces A2 and A5 (exclusively for circuit data) are defined for user traffic between an MSC 20 and a BSC 32. An interface A3 is defined to connect a target BS 40 to an SDU (Frame Selection/Distribution Unit Function) 34 of a source BS 30 to implement a soft/softer handoff. Signaling messages and user data are transmitted between the target BS 40 and the SDU 34 of the source system 30 by the interface A3. An interface A7 is defined for signal transmission/reception between the target BS 40 and the source BS 30 for inter-BS soft/softer handoff.

The wired communication lines of this CDMA mobile communication system include a forward link directed from the MSC 20 to the BS 30, a reverse link directed from the BS 30 to the MSC 20, and a line between the BSs 30 and 40. The MSC 20 includes a call control and mobility management block 22 and a switching block 24. The MSC 20 is connected to a data network (not shown) such as the Internet through an IWF (InterWorking Function) 50. Interfaces A8 and A9 are defined for user traffic and signaling, respectively between a BS and a PCF (Packet Control Function) 60 and interfaces A10 and A11 are defined for user traffic and signaling, respectively, between the PCF 60 and a PDSN (Packet Data Serving Node) 70.

FIG. 2 is a diagram showing a DCCH signal flow between a BTS and a BSC (BSC-SDU) in conventional CDMA technology. This operation may occur between the BSC 32 (BSC-SDU 34) and a BTS 36 in the source BS 30, or a BSC 42 and a BTS 44 in the target BS 40.

With continued reference to FIG. 2, upon detection of a DTX mode, the BTS determines the type of a data frame to transmit to the BSC and generates a reverse DCCH message in step 11. The reverse DCCH message is supposed to be transmitted to the BSC in every predetermined period (e.g. 20 ms) in response to a reverse DCCH frame received in the predetermined period from an MS (not shown). Step 11 will be described later in more detail with reference to FIGS. 3A and 3B.

In step 12, the BTS transmits the reverse DCCH message to the BSC. The reverse DCCH message may contain a data/null/idle/erasure frame. The BSC receives and processes the reverse DCCH message and generates a forward DCCH message in step 13. Reception of the reverse DCCH message is described below in more detail with reference to FIG. 5; processing the reverse DCCH message and generation of the forward DCCH message is described below with reference to FIGS. 4A and 4B.

In step 14, the BSC transmits the forward DCCH message to the BTS. The forward DCCH message may contain a data/null/idle/erasure frame. The BTS performs a forward/reverse power control for the MS based on power control information included in the forward DCCH message in step 15. Reception of the forward DCCH message is described below in more detail with reference to FIG. 6.

To summarize the operation shown in FIG. 2, after receiving a data frame in every predetermined period (20 ms) from the MS, the BTS generates a reverse DCCH message in the predetermined period and transmits it to the BSC. The BSC processes the reverse DCCH message, generates a forward DCCH message, and transmits it to the BTS. Then, the BTS performs a power control for the MS based on power control information included in the forward DCCH message.

FIGS. 3A and 3B are flowcharts illustrating a conventional reverse DCCH message transmitting operation. In this operation, the BTS transmits a frame received in the predetermined period from the MS as a reverse DCCH message to the BSC-SDU. The following description is conducted with the appreciation that a reverse DCCH message is constructed in the same format as an FCH (Fundamental Channel) message shown in FIGS. 7 and 10, and thus defined as a reverse FCH/DCCH message.

Referring to FIG. 3A, the BTS determines whether it has secured radio resources related with the MS and acquired the MS in step 101. If it has not, the BTS considers that it tries to synchronize with the MS and sets Frame Content in an IS-2000 reverse DCCH message shown in FIG. 10 to an idle frame to synchronize with the BSC-SDU in step 104. Since the BTS is being synchronized with the BSC-SDU, it sets power control information in the reverse FCH/DCCH message that will be transmitted to the BSC-SDU to values negligible to the BSC-SDU in step 106. In step 107, the BTS transmits the IS-2000 reverse FCH/DCCH message to the BSC-SDU.

On the other hand, if the BTS has secured the radio resources related with the MS and acquired the MS in step 101, it checks the quality of a frame received from the MS in step 102. If the data frame is bad, the BTS sets Frame Content of the reverse FCH/DCCH message to an erasure frame in step 104-1. In step 106-1, the BTS sets the power control information of the reverse FCH/DCCH message to values negligible to the BSC-SDU. The BTS transmits the IS-2000 reverse FCH/DCCH message without any data to the BSC-SDU since the received frame is bad in step 107-1. Upon recognition of the erasure frame, the BSC-SDU requests the MS to increase its transmission power regarding reverse power control. That is, since the data frame received from the MS is bad, the BSC-SDU will request the MS to transmit a data frame with incremented power.

If the BTS determines that the received frame is good in step 102, it detects a DTX mode during reception of a reverse DCCH frame from the MS by a known DTX mode detection method applied to a radio transmission period between an MS and a BTS in step 103. If the DTX mode is detected, the BTS goes to step 104-3, otherwise, it goes to step 104-2.

In step 104-2, the BTS sets Frame Content of the reverse FCH/DCCH message to a data frame. The BTS checks whether Frame Content of the latest forward DCCH frame received from the BSC-SDU indicates a null frame in step 105A. If it does not indicate a null frame, the BTS sets information elements related with power control according to the DCCH frame received from the MS in step 106-2.

On the contrary, if the latest forward DCCH frame is a null frame, the BTS sets power control information in the reverse FCH/DCCH message to be negligible to the BSC-SDU in step 106-3. In step 107-2, the BTS transmits the IS-2000 reverse FCH/DCCH message with the data of the 20-ms data frame received from the MS encapsulated to the BSC-SDU. The data received from the MS is filled in Reverse Link Information of the reverse FCH/DCCH message.

Upon detection of a DTX mode in step 103, the BTS sets Frame Content of the reverse FCH/DCCH message to a null frame in step 104-3 in FIG. 3B. In step 105B, the BTS checks whether the latest forward DCCH message is a null frame. If it is not a null frame, the BTS maintains power control information at the DTX mode detected point in the power control information elements of the reverse FCH/DCCH message in step 106-4.

On the other hand, if the latest forward DCCH is a null frame, the BTS sets the power control information of the reverse FCH/DCCH message to be negligible to the BSC-SDU in step 106-5. Since there is no data in the 20-ms frame received from the MS, the BTS transmits the IS-2000 reverse FCH/DCCH message without any data to the BSC-SDU in step 107-3. Here, no data is filled in Reverse Link Information.

FIGS. 4A and 4B are flowcharts illustrating a conventional forward DCCH message transmitting operation. In this operation, the BSC-SDU transmits a forward DCCH message to the BTS in every predetermined period (20 ms). It is to be noted in the following description that a forward DCCH message is constructed in the same format as an FCH shown in FIGS. 7 and 8, and thus defined as a forward FCH/DCCH messages.

Referring to FIG. 4A, the BSC-SDU determines whether it has secured forward radio resources related with the MS and acquired the MS in step 201. If it has not, the BSC-SDU considers that it is being synchronized with the MS and sets Frame Content in an IS-2000 forward FCH/DCCH message of FIG. 8 to an idle frame to synchronize with the BTS in step 203. Since the BSC-SDU is being synchronized with the BTS, it sets power control information in the forward FCH/DCCH message that will be transmitted to the BTS to appropriate values in step 206. Here, forward power control information is set to an initial value for control of the MS and reverse power control information is set based on power control information included in a reverse DCCH message received every 20 ms from the BTS. In step 207, the BSC-SDU transmits the forward DCCH message with the set power control information to the BTS. Here, no data is loaded in the forward DCCH message.

On the other hand, if the BSC-SDU has secured the radio resources related with the MS and acquired the MS in step 201, it checks whether there is data to be transmitted to the MS in the BSC or an external network element (e.g., PDSN) in step 202. If there is no data to transmit to the MS, the BSC-SDU goes to step 203-1 and if there exists data to transmit to the MS, it goes to step 203-2.

In step 203-1, the BSC-SDU sets Frame Content of the forward FCH/DCCH message to a null frame. The BSC-SDU checks whether Frame Content of the latest reverse DCCH frame received from the BTS indicates one of a null frame and an idle frame in step 204A. If it is neither a null frame nor an idle frame, the BSC-SDU checks whether Frame Content of the latest reverse DCCH message indicates an erasure frame in step 205A. If it does not indicate an erasure frame, the BSC-SDU sets power control information in the forward FCH/DCCH message based on power control information included in the reverse DCCH message received from the BTS every 20 ms in step 206-1A. Since there is no data to transmit to the MS, the BSC-SDU loads no data in the forward FCH/DCCH message and transmits it to the BTS in step 207-1.

If Frame Content of the latest reverse DCCH message indicates an erasure frame in step 205A, the BSC-SDU sets a reverse power control information value to indicate power-up on a reverse link in the forward FCH/DCCH message in step 206-2A. Since there exists no data to transmit to the MS, the BSC-SDU transmits the forward FCH/DCCH frame without any data to the BTS in step 207-1.

If Frame Content of the latest reverse DCCH message indicates one of a null frame and an idle frame in step 204A, the BSC-SDU maintains the power control information included in the reverse DCCH message received from the BTS every 20 ms. The power control information is maintained until an erasure frame or a data frame is received from the BTS. That is, the BSC-SDU sets the power control information value to the previous value in the forward FCH DCCH message in step 206-3A. Since there exists no data to transmit to the MS, the BSC-SDU transmits the forward FCH/DCCH frame without any data to the BTS in step 207-1.

If there exists data to transmit to the MS in step 202, the BSC-SDU sets Frame Content of the forward FCH/DCCH to a data frame of 9600 bps or 14400 bps in step 203-2 of FIG. 4B. Then, steps 204B to 207-2 are performed in the same manner as steps 204A to 206-3A. In step 204B, the BSC-SDU checks whether Frame Content of the latest reverse DCCH message is one of a null frame and an idle frame. If it is neither a null frame nor an idle frame, the BSC-SDU checks whether Frame Content of the latest reverse DCCH message indicates an erasure frame in step 205B. If it does not indicate an erasure frame either, it sets the power control information in the forward DCCH message based on power control information included in the reverse DCCH message received from the BTS in step 206-1B. Since there is data to transmit to the MS, the BSC-SDU transmits the forward FCH/DCCH message with the data to the BTS in step 207-2.

If the Frame Content of the latest reverse DCCH message indicates an erasure frame in step 205B, the BSC-SDU sets the reverse power control information value to indicate power-up on the reverse link in the forward DCCH message in step 206-2B. Since there is data to transmit to the MS, the BSC-SDU transmits the forward FCH/DCCH frame with the data to the BTS in step 207-2.

If Frame Content of the latest reverse DCCH message indicates one of a null frame and an idle frame in step 204B, the BSC-SDU maintains the power control information included in the reverse DCCH message received from the BTS every 20 ms. The power control information is maintained until an erasure frame or a data frame is received from the BTS. That is, the BSC-SDU sets the power control information of the forward DCCH message to the previous values in step 206-3B. Since there is data to transmit to the MS, the BSC-SDU transmits the forward FCH/DCCH frame with the data to the BTS in step 207-2.

FIG. 5 is a flowchart illustrating a conventional reverse DCCH message receiving operation. In this operation, the BSC-SDU receives and processes a reverse DCCH message in every predetermined period (e.g., 20 ms) from the BTS.

Referring to FIG. 5, the BSC-SDU receives a reverse FCH/DCCH message from the BTS every 20 ms in step 300. The BSC-SDU determines whether Frame Content of the received message indicates an erasure frame in step 301. If the received frame is an erasure frame, the BSC-SDU goes to step 304, otherwise, it goes to step 302. In the case of an erasure frame, it implies that a frame received at the BTS from the MS is bad. Therefore, the BSC-SDU neglects all information in the received reverse DCCH message and generates a forward FCH/DCCH message indicating reverse power-up in step 304.

If the received reverse DCCH frame is not an erasure frame in step 301, the BSC-SDU determines whether Frame Content of the received frame indicates an idle frame in step 302. In the case of an idle frame, the BSC-SDU neglects all information of the received reverse FCH/DCCH message and generates a forward FCH/DCCH message with reverse power control information maintained at an initial value, considering that the BTS has not recognized the radio resources related with the MS or has not assigned the radio resources in step 304-1.

If the received reverse FCH/DCCH message is not an idle frame in step 302, the BSC-SDU determines whether its Frame Content indicates a null frame in step 303. In the case of a null frame, the BSC-SDU neglects all information of the received reverse FCH/DCCH message and generates a forward DCCH message with reverse power control information maintained at a value set just before a DTX mode is recognized, considering that a reverse channel between the MS and the BTS is in the DTX mode in step 304-2.

If the reverse FCH/DCCH message is not a null frame in step 303, which implies that it is a data frame, the BSC-SDU transmits data included in Reverse Link Information of the reverse FCH/DCCH message to a corresponding data processing device (not shown) according to the type of the data and generates a forward DCCH message with forward/reverse power control information based on an analysis of power control information included in the reverse FCH/DCCH message in step 304-3.

FIG. 6 is a flowchart illustrating a conventional forward FCH/DCCH message receiving operation. In this operation, the BTS receives and processes a forward FCH/DCCH message in every predetermined period (e.g., 20 ms) from the BSC-SDU.

Referring to FIG. 6, the BTS receives a forward FCH/DCCH message from the BSC every 20 ms in step 400. The BTS determines whether Frame Content of the received message indicates an idle frame in step 401. In the case of an idle frame, the BTS analyses all information of the received forward FCH/DCCH message and transmits reverse/forward power control information set in the forward message to a power control processor (not shown) in step 403. Here, no frames are transmitted on a forward radio link.

If the forward FCH/DCCH message is not an idle frame in step 401, the BTS determines whether Frame Content of the forward FCH/DCCH message indicates a null frame in step 402. In the case of a null frame, the BTS analyses all information of the forward FCH/forward DCCH message and transmits reverse/forward power control information set in the forward message to the power control processor in step 403-1. Here, no frames are transmitted on the forward radio link.

If the forward FCH/DCCH message is not a null frame in step 402, which implies that it is a data frame, the BTS analyses all information of the forward FCH/DCCH message and transmits reverse/forward power control information set in the forward message to the power control processor in step 403-2. Here, data included in the channel information of the forward DCCH message is transmitted on the forward radio link.

FIG. 7 illustrates the structure of a message transmitted from the BSC to the BTS on a user traffic sub-channel of an FCH. The message is used to transmit a forward traffic channel frame directed to the MS. This message can be transmitted between a BTS and a BSC in the same BS or between a BTS and a BSC in different BSs although the message is differently called according to the interfaces. For example, the message is called a forward Abis DCCH message in the former case and a forward A3 DCCH message in the latter case.

FIG. 8 illustrates an example Forward Layer 3 FCH/DCCH Data representing control information for a forward CDMA traffic channel frame and a packet directed from an SDU to a target BTS.

FIG. 9 illustrates a message transmitted from the BTS to the BSC on a user traffic sub-channel of an FCH. This message is used for the BTS to transmit a reverse traffic channel frame and control information. The message can be transmitted between a BTS and a BSC in the same BS or between a BTS and a BSC in different BSs although the message is differently called according to the interfaces. For example, the message is called a reverse Abis DCCH message in the former case and a reverse A3 DCCH message in the latter case.

FIG. 10 illustrates an example Reverse Layer 3 FCH/DCCH Data representing control information for a reverse CDMA traffic channel frame and a packet directed from a target BTS to an SDU.

The above-described conventional method produces the following two main disadvantages in a BS.

1. Unstable forward/reverse power control for a DTX period: Since power control information effective at the start point of a DTX mode is maintained for the whole DTX period, an effective power control cannot be performed in reality for the DTX period. Furthermore, power control information for use in power control at the end of the DTX mode reflects no real radio situations, which increases an error rate for a radio transmission period; and 2. Non-supportability for slow power control on forward DCCH: One bit for slow power control, namely an EIB (Erasure Indicator Bit) for an FCH is transmitted in every 20-ms frame in the conventional technology. Because a DCCH supports a DTX mode, the EIB for the FCH is not effective in slow power control. Therefore, slow forward power control should be performed on the DCCH by supporting a QIB (Quality Indicator Bit) that works well in both a DTX mode and a non-DTX mode. Here, the EIB is one bit of power control information for an FCH in a 20-ms frame and the QIB is one bit of power control information for a DCCH in a 20-ms frame.

SUMMARY OF THE INVENTION

It is, therefore, an object of the present invention to provide an apparatus and method for effectively supporting power control on a forward/reverse DCCH for a DTX period in a CDMA mobile communication system.

It is another object of the present invention to provide an apparatus and method for performing slow power control on a DCCH by use of a QIB in a CDMA mobile communication system.

The foregoing and other objects are achieved by a method of supporting power control on a DCCH in a BS. According to one aspect of the present invention, a BTS receives forward power control (FPC) mode information indicating a low power control from the BSC and transmits the FPC mode information to an MS. Then, the BTS extracts a QIB that is a power control command in a frame period from a reverse pilot channel received from the MS according to the FPC mode information and determines the status of the QIB. The BTS transmits information requesting the BSC to change a threshold for a power control on a forward DCCH based on the determined QIB status to the BSC.

According to another aspect of the present invention, a BTS detects a DTX period by measuring the energy of a DCCH data frame received from an MS, determines reception status by measuring the energy of a PCB on a reverse pilot channel if the DTX mode is detected, determines FQI (Frame Quality Indicator) information according to the determined reception status, and transmits the FQI information to a BSC.

BRIEF DESCRIPTION OF THE DRAWINGS

The above and other objects, features and advantages of the present invention will become more apparent from the following detailed description when taken in conjunction with the accompanying drawings in which:

FIG. 7 illustrates a forward DCCH data frame directed from the BSC to the BTS in the prior art mobile communication system;

FIG. 8 illustrates the structure of the forward DCCH data frame directed form the BSC to the BTS in the prior art mobile communication system;

FIG. 9 illustrates a reverse DCCH data frame directed from the BTS to the BSC in the prior art mobile communication system;

FIG. 10 illustrates the structure of the reverse DCCH data frame directed form the BTS to the BSC in the prior art mobile communication system;

FIG. 12 illustrates a reverse DCCH data frame directed from the BTS to the BSC according to the present invention;

FIG. 13 illustrates the structure of the reverse DCCH data frame directed from the BTS to the BSC according to the present invention;

FIGS. 14A and 14B are flowcharts illustrating a forward DCCH message transmission procedure according to the present invention in which the BSC-SDU transmits a forward DCCH message to the BST in every predetermined period;

FIG. 16 is a flowchart illustrating a forward DCCH message reception procedure according to the present invention in which the BTS receives and processes the forward DCCH message from the BSC-SDU in the predetermined period;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method of supporting a radio channel environment in which a large amount of data is processed in a BTS and a BSC of a CDMA mobile communication system. Particularly, the present invention provides a method of supporting forward/reverse power control on a DCCH that is used for transmission of high rate data and related signals, power control, and MAC transmission in a BTS and a BSC.

Figure 1:
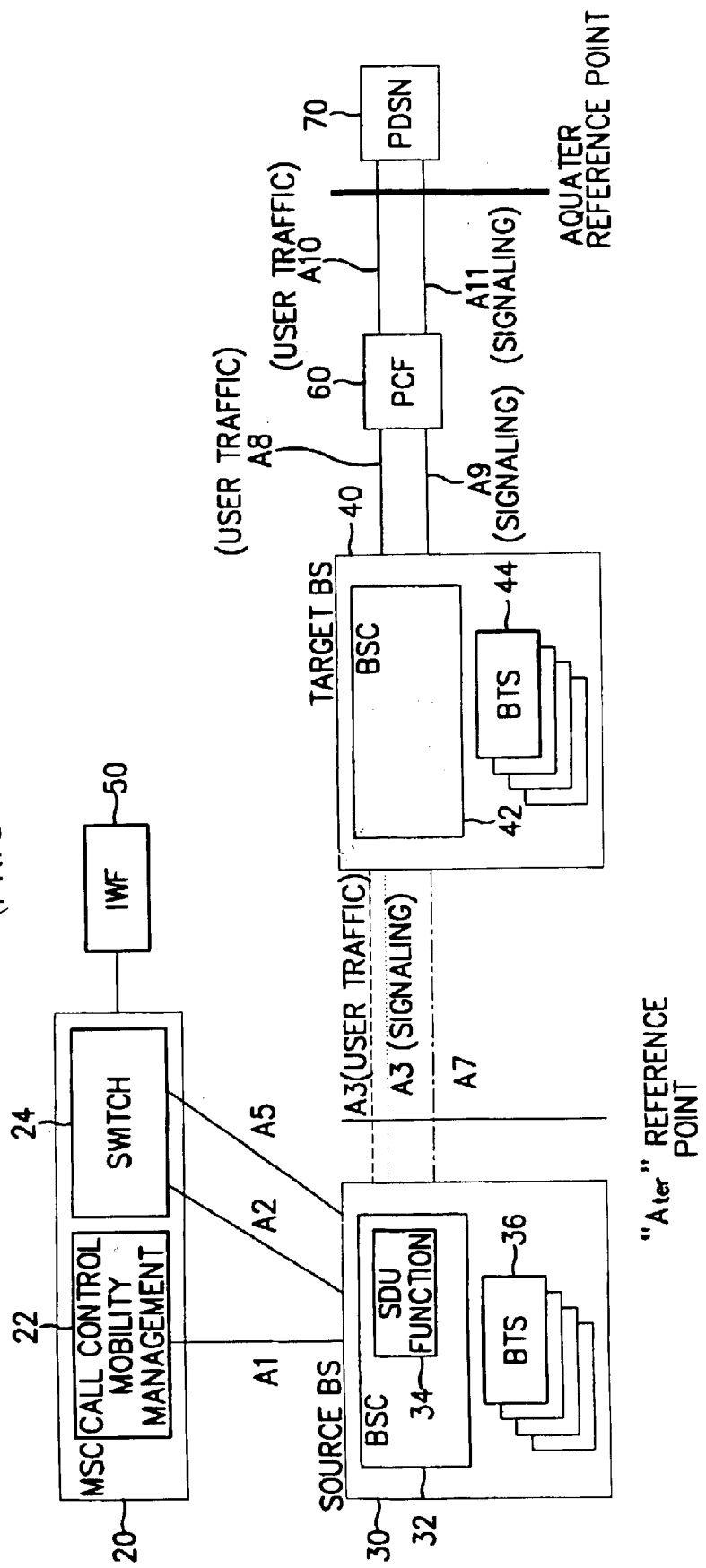
FIG. 1 illustrates a 3G IOS reference model of an MSC, BSs, and digital air interfaces between the BSs in a prior art mobile communication system.
Figure 2:
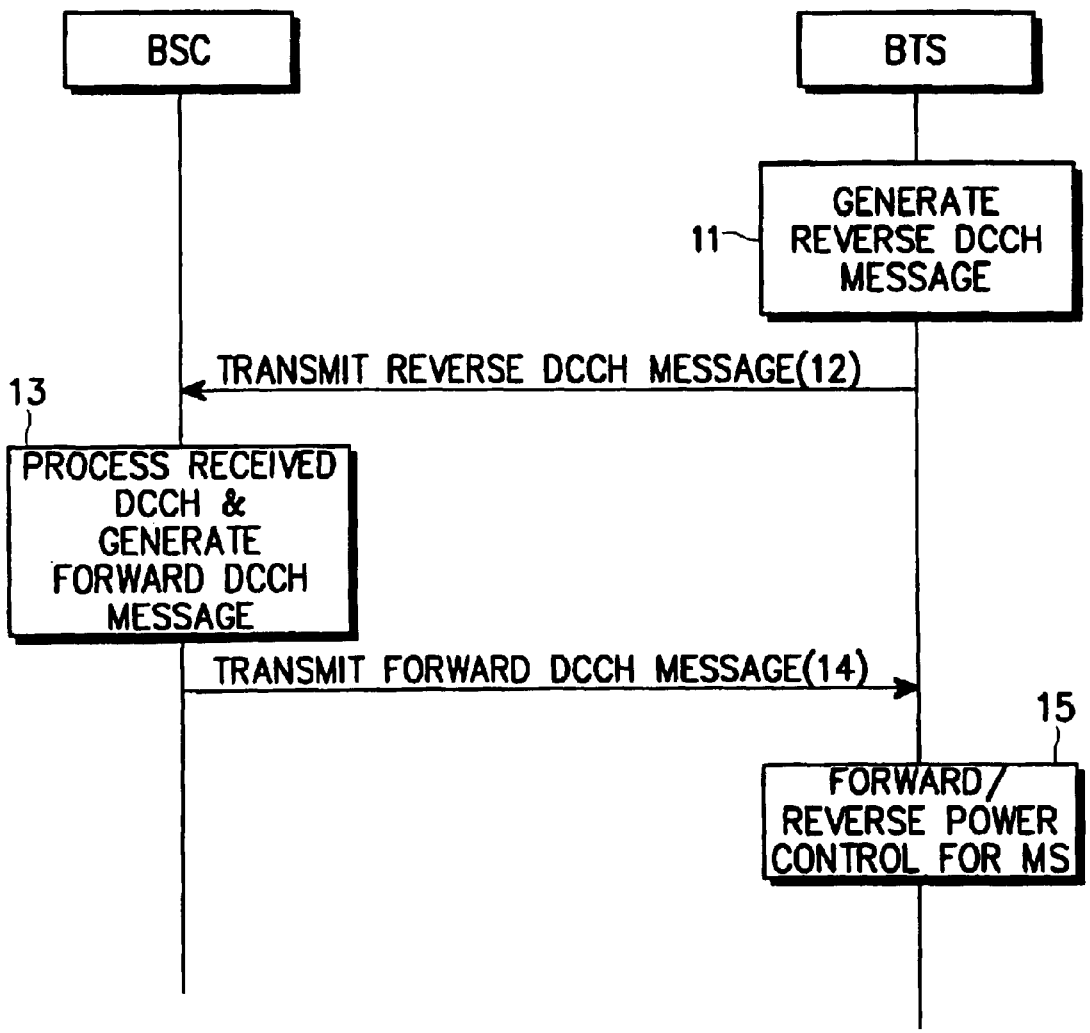
FIG. 2 is a diagram illustrating a conventional DCCH signal exchange between a BTS and a BSC.
Figure 3A:
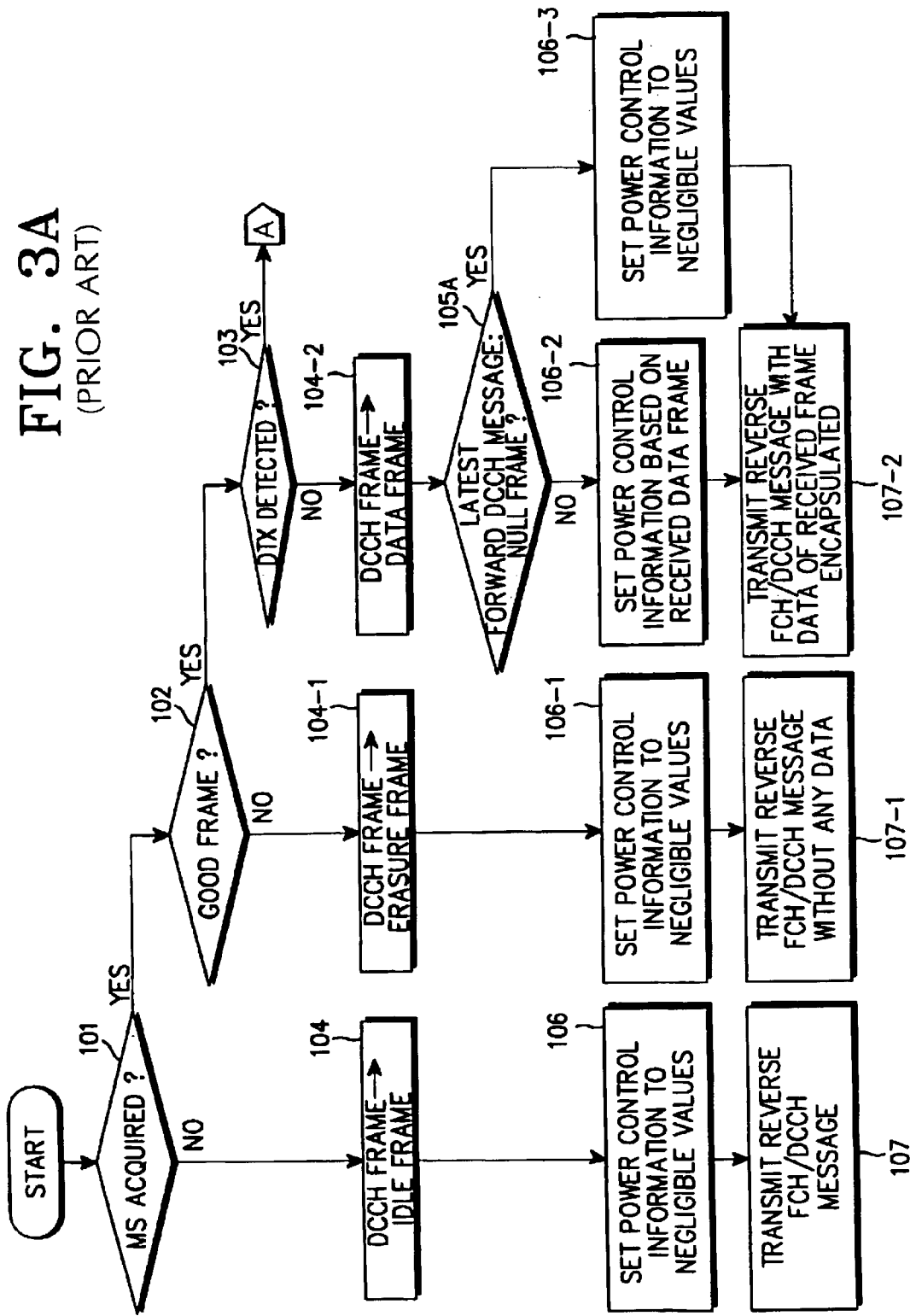
FIGS. 3A and 3B are flowcharts illustrating a prior art reverse DCCH message transmission procedure in which the BTS transmits a frame received from an MS in every predetermined period as a reverse DCCH message to the BSC-SDU.
Figure 3B:
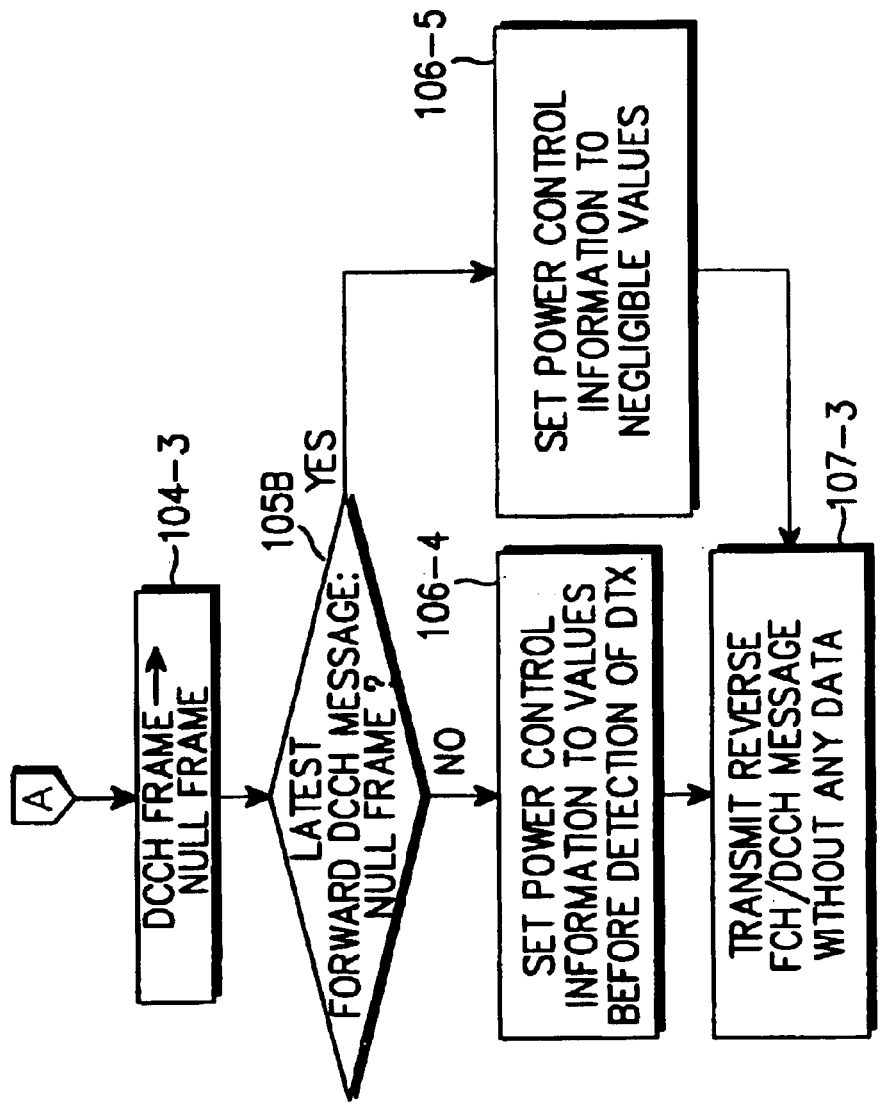
Figure 4A:
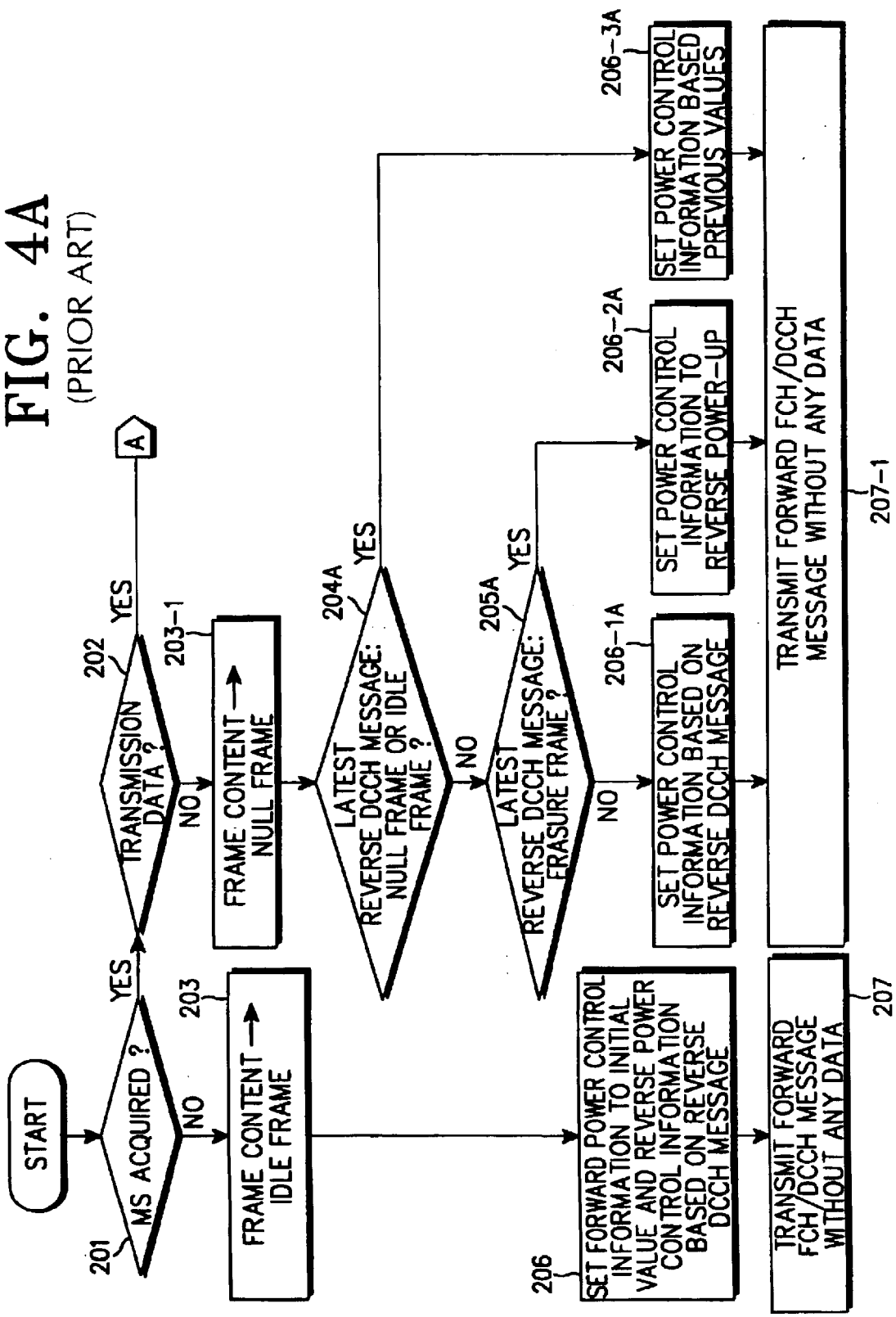
FIGS. 4A and 4B are flowcharts illustrating a prior art forward DCCH message transmission procedure in which the BSC-SDU transmits a forward DCCH message to the BTS in every predetermined period.
Figure 4B:
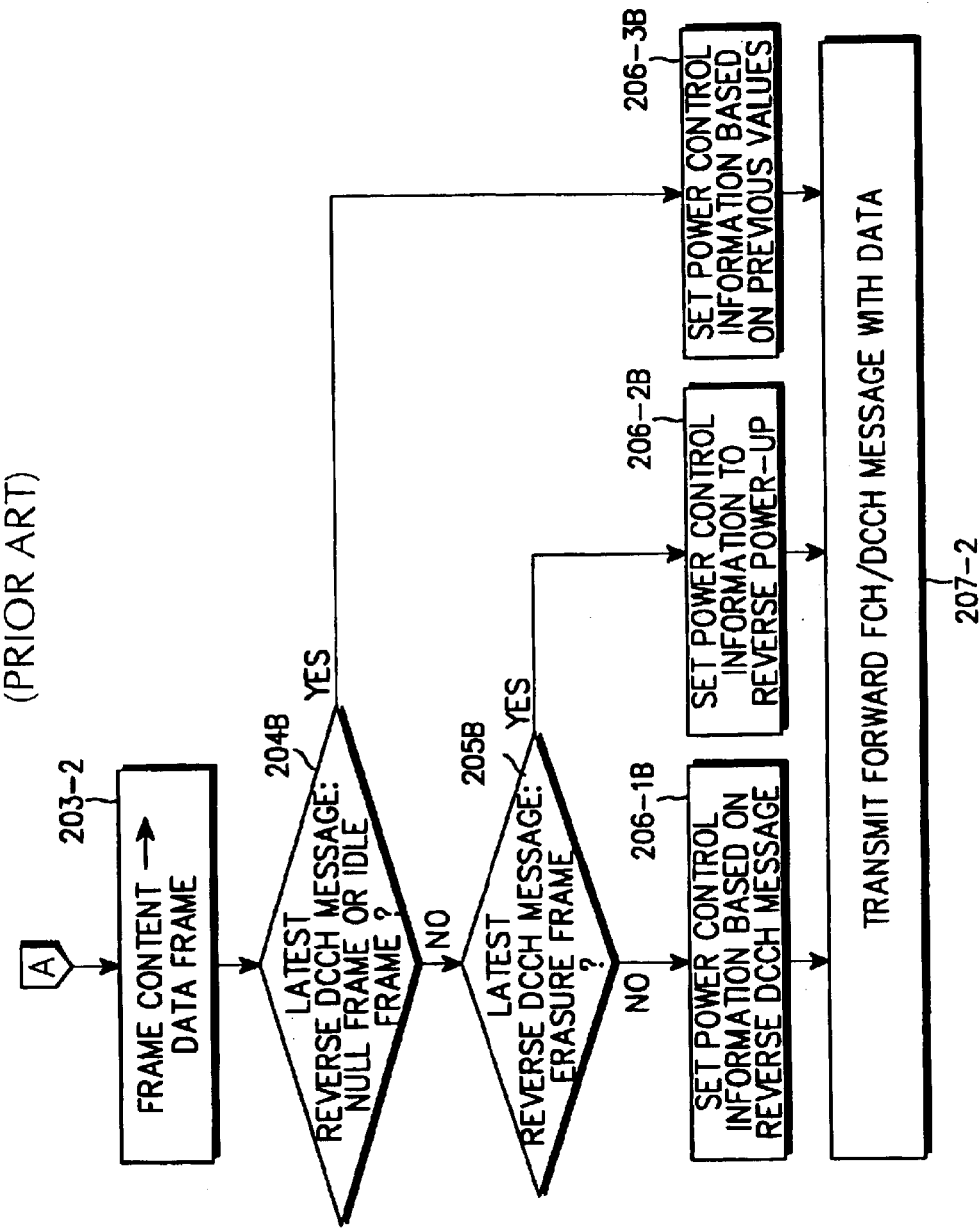
Figure 5:
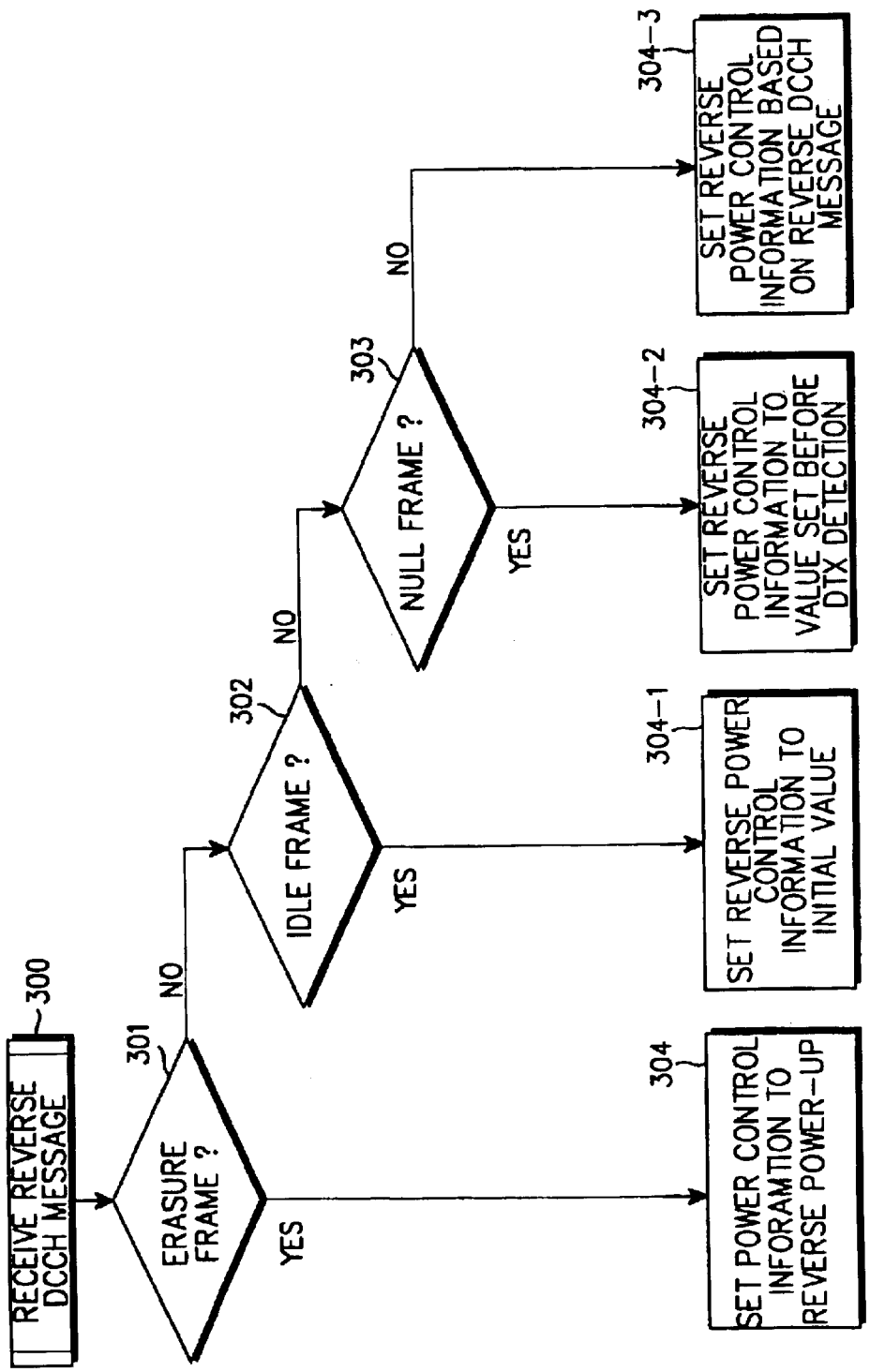
FIG. 5 is a flowchart illustrating a prior art reverse DCCH message reception procedure in which the BSC-SDU receives and processes a reverse DCCH message from the BTS in the predetermined period.
Figure 6:
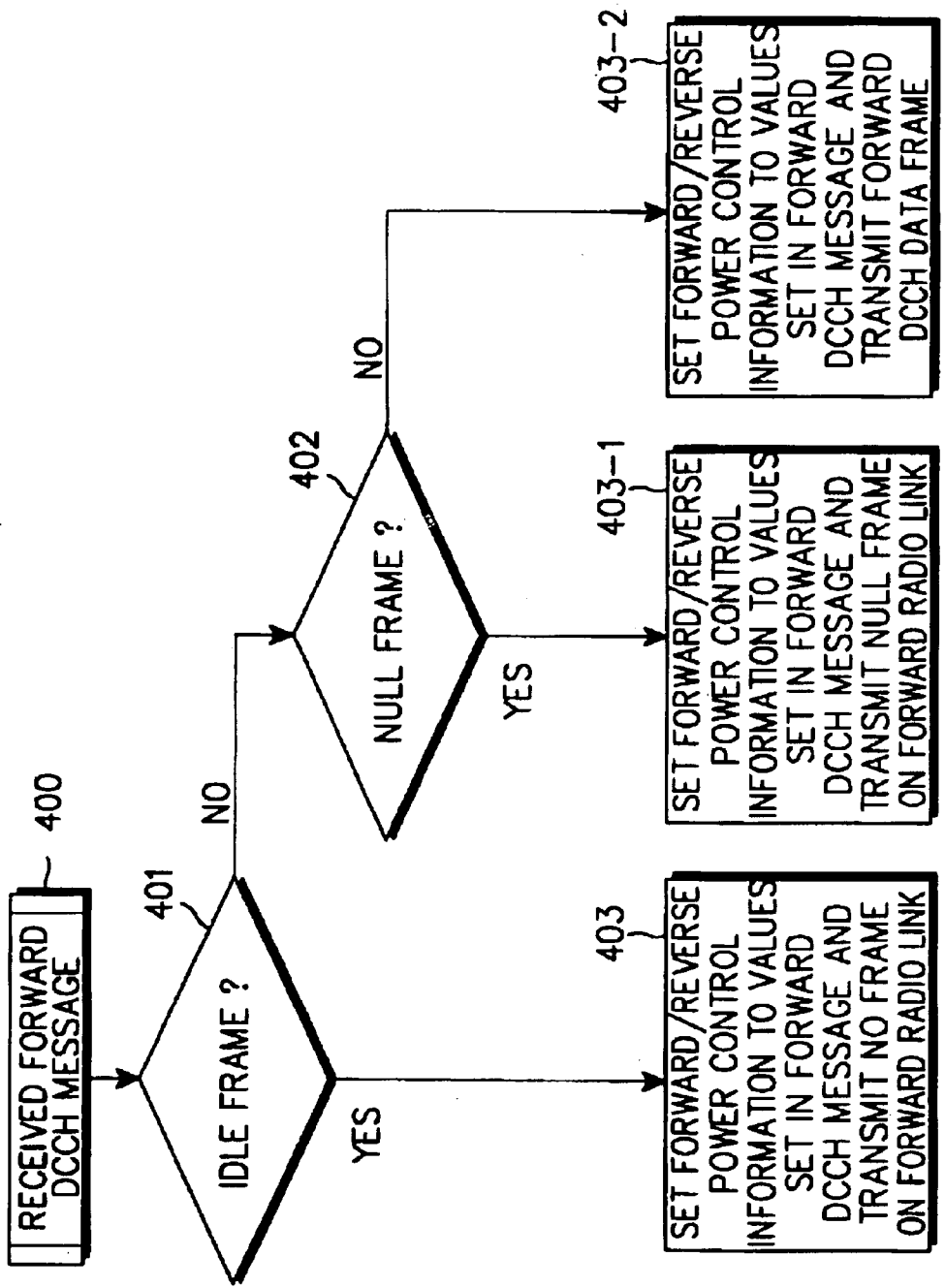
FIG. 6 is a flowchart illustrating a prior art forward DCCH message reception procedure in which the BTS receives and processes the forward DCCH message from the BSC-SDU in the predetermined period.
Figure 11A:
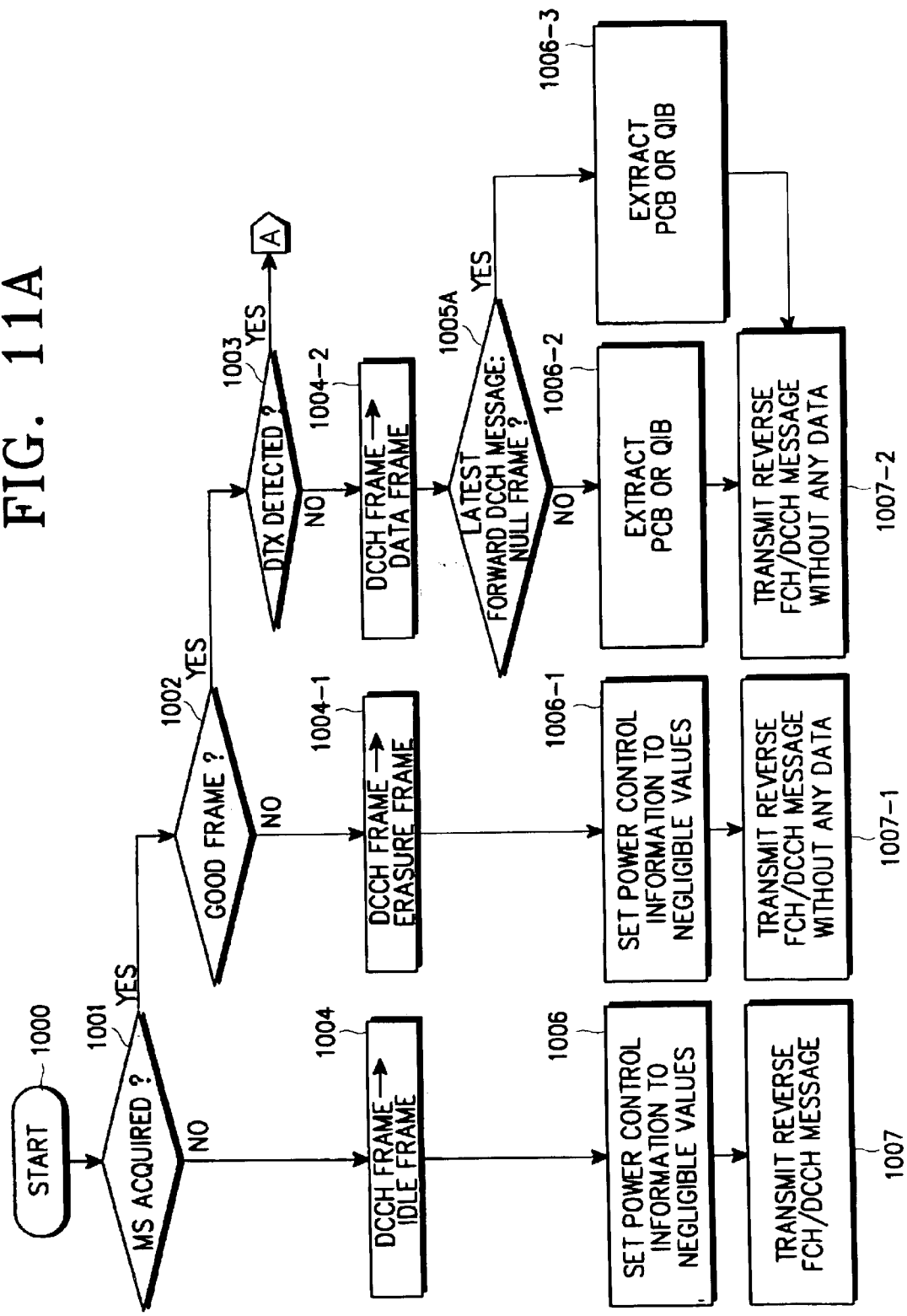
FIGS. 11A and 11B are flowcharts illustrating a reverse DCCH message transmission procedure according to the present invention, wherein the BTS transmits a frame received in every predetermined period from the MS as a reverse DCCH message to the BSC-SDU.
Figure 11B:
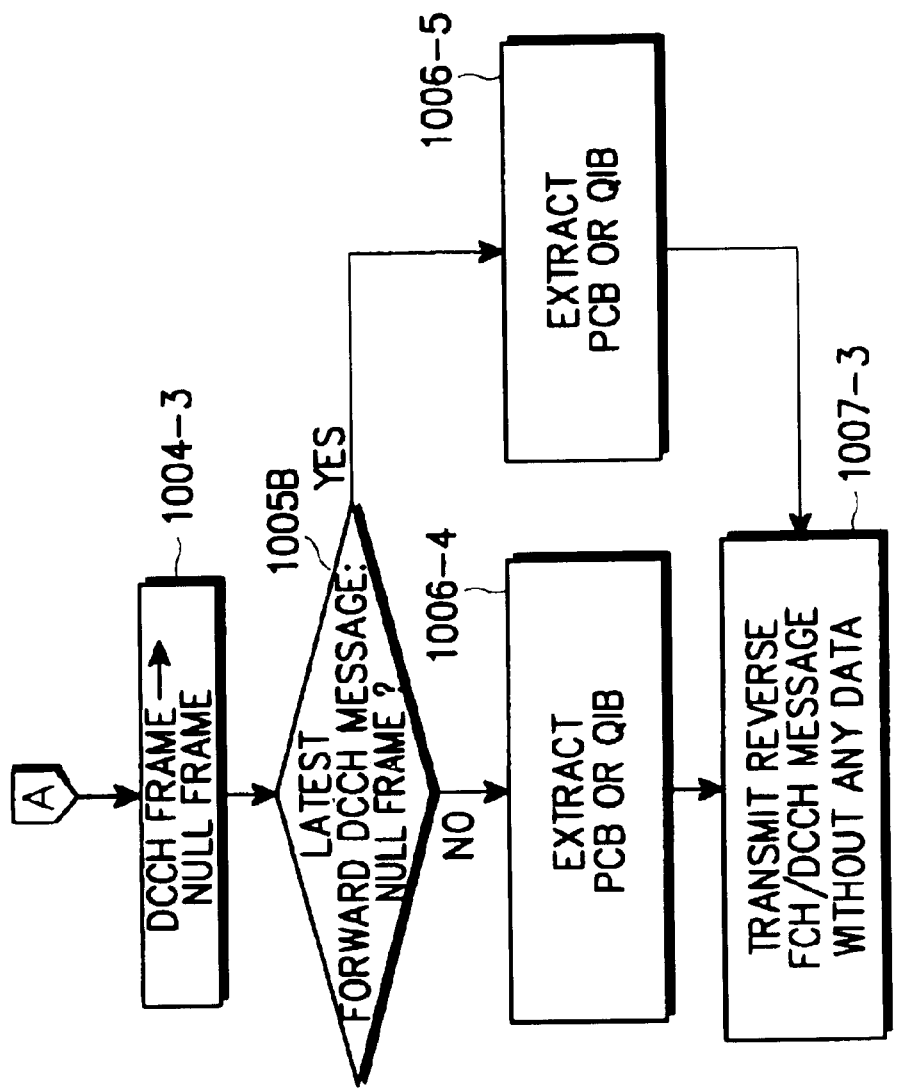

FIGS. 11A and 11B are flowcharts illustrating a reverse DCCH message transmission procedure according to the present invention, wherein the BTS transmits a frame received in every predetermined period from the MS as a reverse DCCH message to the BSC-SDU Referring to FIG. 11A, the BTS determines whether it has secured radio resources related with the MS and acquired the MS in step 1001. If it has not, the BTS considers that it is being synchronized with the MS and sets Frame Content in an IS-2000 reverse FCH/DCCH message shown in FIG. 13 to an idle frame to synchronize with the BSC-SDU in step 1004. Since the BTS is being synchronized with the BSC-SDU, it sets power control information of the reverse FCH/DCCH message that will be transmitted to the BSC-SDU to values negligible to the BSC-SDU in step 1006. In step 1007, the BTS transmits the IS-2000 reverse FCH/DCCH message to the BSC-SDU.

On the other hand, if the BTS has secured the radio resources related with the MS and acquired the MS in step 1001, it checks the quality of a frame received from the MS in step 1002. If the data frame is bad, the BTS sets Frame Content in the reverse FCH/DCCH message to an erasure frame in step 1004-1. In step 1006-1, the BTS sets the power control information of the reverse FCH/DCCH message to values negligible to the BSC-SDU. Since the received frame is bad, the BTS transmits the IS-2000 reverse FCH/DCCH message without any data to the BSC-SDU in step 1007-1. Upon recognition of the erasure frame, the BSC-SDU will request the MS to transmit a frame with incremented power since the frame received from the MS is bad.

If the BTS determines that the received data frame is good in step 1002, it detects a DTX mode during receiving a reverse DCCH frame from the MS by a known DTX mode detection method applied to a radio period between an MS and a BTS in step 1003. If the DTX mode is detected, the BTS goes to step 1004-3 and otherwise, it goes to step 1004-2.

In step 1004-2, the BTS sets Frame Content of the reverse FCH/DCCH message to a data frame. The BTS checks whether the latest forward DCCH frame received from the BSC-SDU is a null frame in step 1005A. If it is not a null frame, the BTS extracts power control information (PCB or QIB) from a reverse pilot channel according to a predetermined forward power control mode (FPC_MODE) in step 1006-2. If a fast power control mode is set, the BTS extracts a PCB from the reverse pilot channel at 800, 400, or 200 bps according to FPC_MODE=000, 001, 010, or 110, performs a fast inner loop forward power control, and sets QIB/EIB of the reverse FCH/DCCH message to 0. On the other hand, if a slow power control mode is set, the BTS extracts a QIB from the reverse pilot channel received from the MS according to FPC_MODE=100 or 101, performs a slow power control, and sets QIB/EIB of the reverse FCH/DCCH message to the extracted QIB value (see FIG. 13).

If the latest forward DCCH message is a null frame, which implies that the previous forward DCCH frame was transmitted to the MS in the DTX mode, the MS generates a power control command with the null frame received from the BTS and transmits the power control command on a reverse pilot channel. Here, the MS transmits a PCB or QIB to the BTS according to a preset forward power control mode. Thus, the BTS extracts the power control information (PCB or QIB) from the reverse pilot channel according to FPC_MODE in step 1006-3. If a fast power control mode is set, i.e., the PCB is received, the BTS extracts a PCB from the reverse pilot channel at 800, 400, or 200 bps according to FPC_MODE=000, 001, 010,1 or 10; performs a fast inner loop forward power control; and sets QIB/EIB of the reverse FCH/DCCH message to 0.

On the other hand, if a slow power control mode is set, i.e., the QIB is received, the BTS extracts a QIB from the reverse pilot channel according to FPC_MODE=100 or 101; performs a slow power control; and sets QIB/EIB of the reverse FCH/DCCH message to the extracted QIB value (see FIG. 13). In step 1007-2, the BTS transmits the IS-2000 reverse FCH/DCCH frame with the data of the 20-ms frame received from the MS encapsulated to the BSC-SDU.

If the DTX mode is detected in step 1003, the BTS sets Frame Content of the reverse FCH/DCCH message to a null frame in step 1004-3 of FIG. 11B. In step 1005B, the BTS checks whether the latest forward DCCH message received from the BSC-SDU is a null frame. If it is not a null frame, the BTS extracts power control information (PCB or QIB) from the reverse pilot channel received from the MS according to FPC_MODE in step 1006-4.

In the case of a PCB, the BTS performs a fast inner loop forward power control at 800, 400, or 200 bps according to FPC_MODE=000, 001, 010, or 110 and sets QIB/EIB of the reverse FCH/DCCH message to 0. On the other hand, in the case of a QIB, the BTS performs a slow power control according to FPC_MODE=100 or 101 and sets QIB/EIB of the reverse FCH/DCCH message to the QIB of the reverse pilot channel.

An information element related with power control in the reverse DCCH message directed to the BSC-SDU, FQI is set to 0 or 1 according to an inner FQI decision algorithm (see FIGS. 19 and 20) of the BTS in order to indicate that the reverse 20-ms frame is bad or good. The other power control information values are set to appropriate values. However, if the latest forward DCCH message is a null frame, this implies that the previous DCCH frame was transmitted to the MS in the DTX mode. Therefore, the MS generates a power control command based on the null frame received from the BS and transmits it on a reverse pilot channel. Here, the MS transmits a PCB or a QIB to the BS according to a preset forward power control mode. Thus, the BTS extracts the power control information (PCB or QIB) from the reverse pilot channel according to FPC_MODE in step 1006-5.

In the case of a PCB, the BTS performs a fast inner loop forward power control at 800, 400, or 200 bps according to FPC_MODE=000, 001, 010, or 110 and sets QIB/EIB of the reverse FCH/DCCH message to 0. On the other hand, in the case of a QIB, the BTS performs a slow power control according to FPC_MODE=100 or 101 and sets QIB/EIB of the reverse FCH/DCCH message to the QIB of the reverse pilot channel. FQI is set to 0 or 1 according to an inner FQI decision algorithm of the BTS in order to indicate that the reverse 20-ms frame is bad or good. The other power control information values are set to appropriate values. Since there is no data in the 20-ms frame received from the MS, the BTS transmits the IS-2000 reverse FCH/DCCH frame without any data to the BSC-SDU. Reverse Link Information in the frame has no data.

Figure 14A:
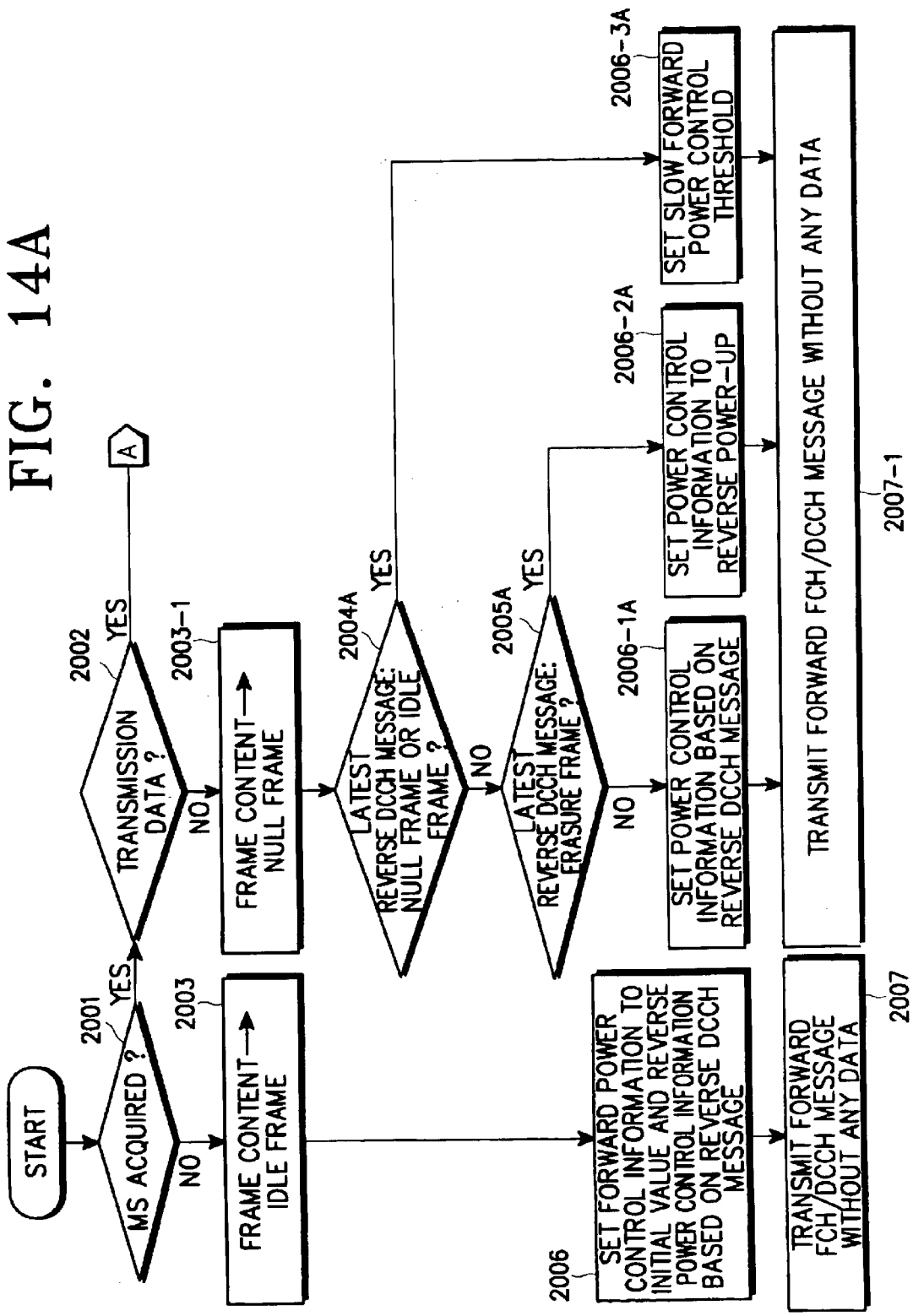

FIGS. 14A and 141 are flowcharts illustrating a forward DCCH message transmitting operation according to the present invention. In this operation, the BSC-SDU transmits a forward DCCH message to the BTS in every predetermined period (20 ms).

Referring to FIG. 14A, the BSC-SDU determines whether it has secured forward radio resources related with the MS and acquired the MS in step 2001. If it has not, the BSC-SDU considers that it is being synchronized with the MS and sets Frame Content of an IS-2000 forward FCH/DCCH message to an idle frame to synchronize with the BTS in step 2003. Since the BSC-SDU is being synchronized with the BTS, it sets power control information of the forward FCH/DCCH message to appropriate values in step 2006. Here, forward power control (FPC) information can be set to an initial value for control of the MS and reverse power control (RPC) information is set based on power control information included in a reverse DCCH message received from the BTS every 20 ms. In step 2007, the BSC-SDU transmits the forward DCCH message with the set power control information to the BTS. Here, no data is loaded in the forward DCCH message.

On the other hand, if the BSC-SDU has secured the radio resources related with the MS and acquired the MS in step 2001, it checks whether there is data to be transmitted to the MS in the BSC or an external network element (e.g., PDSN) in step 2002. If there is no data to transmit to the MS, the BSC-SDU goes to step 2003-1 and if there exists data to transmit to the MS, it goes to step 2003-2 of FIG. 14B.

In step 2003-1, the BSC-SDU sets Frame Content of the forward FCH/DCCH message to a null frame. The BSC-SDU checks whether Frame Content of the latest reverse DCCH frame received from the BTS indicates one of a null frame and an idle frame in step 2004A. If it is neither a null frame nor an idle frame, the BSC-SDU checks whether Frame Content of the latest reverse DCCH message indicates an erasure frame in step 2005A. If it does not indicate an erasure frame either, the BSC-SDU sets power control information in the forward FCH/DCCH message shown in FIG. 8 based on power control information included in the reverse DCCH message received from the BTS every 20 ms in step 2006-1A. Since there is no data to transmit to the MS, the BSC-SDU loads no data in the forward FCH/DCCH message and transmits it to the BTS in step 2007-1.

If the Frame Content of the latest reverse DCCH message indicates an erasure frame in step 2005A, the BSC-SDU sets reverse power control information to indicate power-up on the reverse link in the forward FCH/DCCH message in step 2006-2A. The erasure frame indicates that the frame received from the MS is bad. Since there exists no data to transmit to the MS, the BSC-SDU transmits the forward FCH/DCCH frame without any data to the BTS in step 2007-1.

If Frame Content of the latest reverse DCCH message indicates a null frame in step 2004A, the BSC-SDU refers to power control information (FQI, Reverse Link Quality, QIB, and FPC:SNR) included in the reverse DCCH message received from the BTS every 20 ms in step 2006-3A. Since the reverse DCCH is in a DTX mode, the BSC-SDU also sets a threshold for an outer/inner loop power control on the reverse link and a set point for a slow power control on the forward link for the DTX period in corresponding fields of the forward FCH/DCCH message.

In the case of an idle frame in step 2004A, the BSC-SDU refers to the power control information (FQI, Reverse Link Quality, QIB, and FPC:SNR) included in the IS-2000 reverse DCCH message received from the BTS every 20 ms in step 2006-3A. Since the idle frame indicates that the BTS is being synchronized with the MS, the BSC-SDU also sets an initial value for a power control on the reverse link and a set point for a slow power control on the forward link in the forward FCH/DCCH message (see FIG. 8).

If there exists data to transmit to the MS in step 2002, the BSC-SDU sets Frame Content of the forward FCH/DCCH message to a data frame in step 2003-2 of FIG. 14B. Then, steps 2004B to 2007-2 are performed in the same manner as steps 2004A to 2006-3A. In step 2004B, the BSC-SDU checks whether Frame Content of the latest reverse DCCH message is one of a null frame and an idle frame.

If it is neither a null frame nor an idle frame, the BSC-SDU checks whether Frame Content of the latest reverse DCCH message indicates an erasure frame in step 2005B. If it does not indicate an erasure frame either, the BSC-SDU sets power control information in the forward FCH/DCCH message shown in FIG. 8 based on the power control information (FQI, Reverse Link Quality, QIB, and FPC:SNR) included in the reverse DCCH message received from the BTS every 20 ms in step 2006-1B. Since there exists data to transmit to the MS, the BSC-SDU transmits the forward FCH/DCCH message with the data capsulated to the BTS in step 2007-2.

If the Frame Content of the latest reverse DCCH message indicates an erasure frame in step 2005B, the BSC-SDU sets reverse power control information to indicate power-up on a reverse link in the forward FCH/DCCH message in step 2006-2B. Since there exists data to transmit to the MS, the BSC-SDU transmits the forward FCH/DCCH frame with the data to the BTS in step 2007-2.

If a frame previously received from the BTS is a null frame in step 2004B, the BSC-SDU refers to power control information (FQI, Reverse Link Quality, QIB, and FPC:SNR) included in the IS-2000 reverse DCCH message received from the BTS every 20 ms in step 2006-3B. Since the reverse DCCH is in a DTX mode, the BSC-SDU also sets a threshold for an outer/inner loop power control on the reverse link and a set point for a slow power control on the forward link for the DTX period in corresponding fields of the forward FCH/DCCH message.

In the case of an idle frame in step 2004B, the BSC-SDU refers to the power control information (FQL Reverse Link Quality, QIB, and FPC:SNR) included in the IS-2000 reverse DCCH message received from the BTS every 20 ms in step 2006-3A. Since the idle frame indicates that the BTS is being synchronized with the MS, the BSC-SDU also sets an initial value for a power control on the reverse link and a set point for a slow power control on the forward link in the forward FCH/DCCH message (see FIG. 8). Since there exists data to transmit to the MS, the BSC-SDU transmits the forward FCH/DCCH frame with the data to the BTS in step 2007-2.

Figure 15:
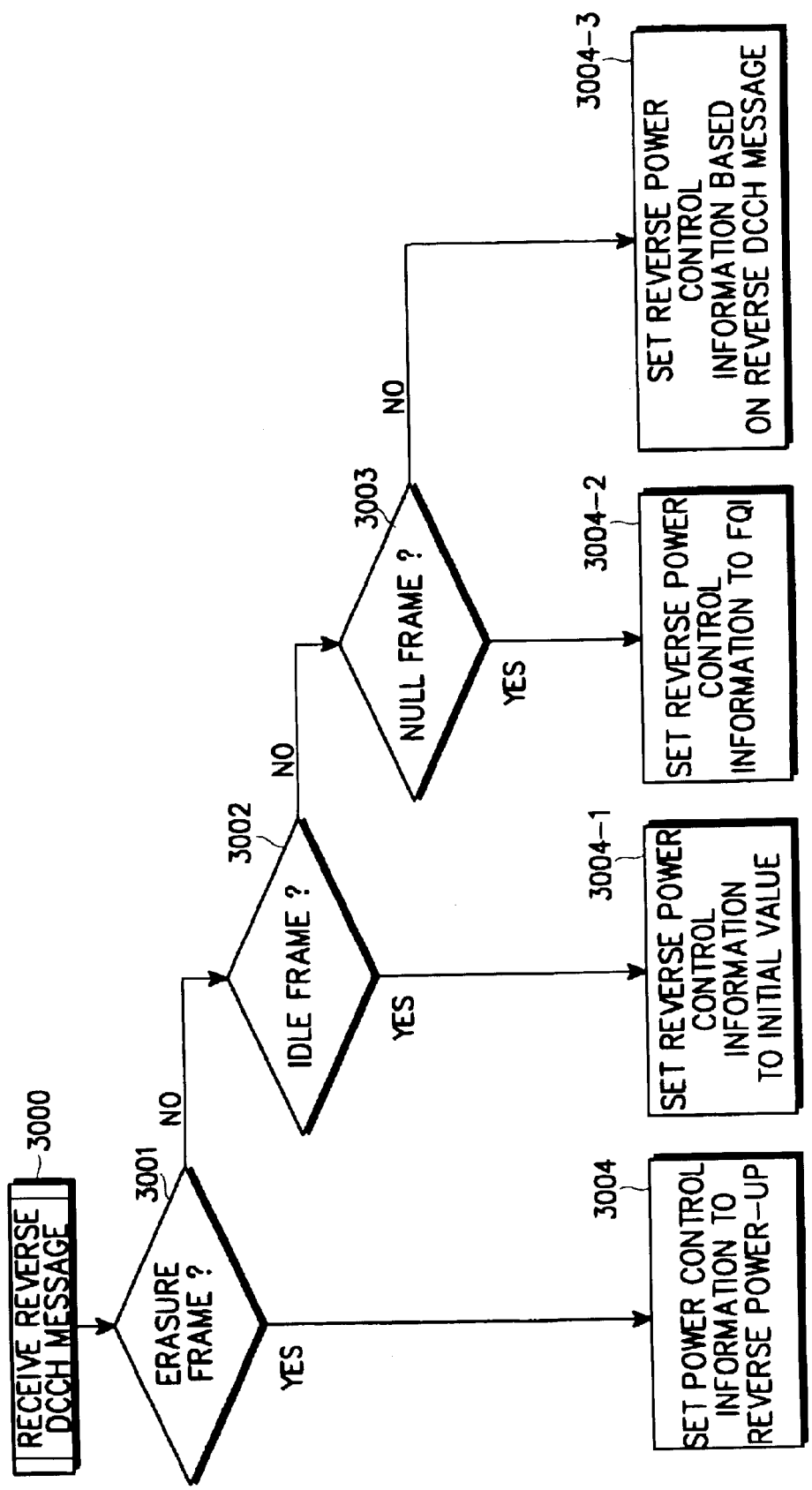
FIG. 15 is a flowchart illustrating a reverse DCCH message reception procedure according to the present invention in which the BSC-SDU receives and processes a reverse DCCH message from the BST in the predetermined period.

FIG. 15 is a flowchart illustrating a reverse DCCH message receiving operation according to the present invention. In this operation, the BSC-SDU receives and processes a reverse DCCH message received in every predetermined period (e.g., 20 ms) from the BTS.

Referring to FIG. 15, the BSC-SDU receives a reverse DCCH message from the BTS every 20 ms in step 3000. The BSC-SDU determines whether Frame Content of the received message indicates an erasure frame in step 3001. If the received frame is an erasure frame, the BSC-SDU goes to step 3004 and otherwise, it goes to step 3002. In the case of an erasure frame, it implies that a frame received at the BTS from the MS is bad. Therefore, the BSC-SDU neglects all information in the received reverse FCH/DCCH message and generates a forward FCH/DCCH message indicating reverse power-up in step 3004.

If the received reverse DCCH frame is not an erasure frame in step 3001, the BSC-SDU determines whether Frame Content of the received frame indicates an idle frame in step 3002. In the case of an idle frame, the BSC-SDU neglects all information of the received reverse FCH/DCCH message and generates a forward FCH/DCCH message with reverse power control information maintained at an initial value, considering that the BTS has not recognized the radio resources related with the MS or has not assigned the radio resources in step 3004-1.

If the received frame is not an idle frame in step 3002, the BSC-SDU determines that a reverse channel between the MS and the BTS is in the DTX mode and sets an outer loop threshold that is a set point for a PCB referring to FQI of the reverse IS-2000 DCCH message in step 3004-2. The BSC-SDU also checks whether the previous forward DCCH frame has errors by reading QIB from the reverse FCH/DCCH message, determines a gain ratio for forward power control, and writes the gain ratio in a corresponding field of the forward FCH/DCCH message.

If the received frame is not a null frame in step 3003, which implies that it is a data frame, the BSC-SDU transmits data included in Reverse Link Information of the received reverse FCH/DCCH message to a corresponding data processing device (not shown) according to the type of the data and generates the forward DCCH message with forward/reverse power control information set based on an analysis of power control information included in the reverse DCCH message in step 3004-3.

FIG. 16 is a flowchart illustrating a forward DCCH message receiving operation according to the present invention. In this operation, the BTS receives and processes a forward DCCH message in every predetermined period (e.g., 20 ms) from the BSC-SDU.

Referring to FIG. 16, the BTS receives a forward FCH/DCCH message from the BSC every 20 ms in step 4000. The BTS determines whether Frame Content of the received message indicates an idle frame in step 4001. In the case of an idle frame, the BTS analyses all information of the received forward DCCH message and transmits reverse/forward power control information set in the forward message to a power control processor (not shown) in step 4003. Here, no frames are transmitted on a forward radio link.

If the received frame is not an idle frame in step 4001, the BTS determines whether Frame Content of the received frame indicates a null frame in step 4002. In the case of a null frame, the BTS analyses all information of the received forward DCCH message and transmits reverse/forward power control information set in the forward message to the power control processor in step 4003-1. Since the DTX mode is set, a forward slow power control set point is transmitted in the form of a QIB to the power control processor of the BTS as in a Non-DTX mode. Meanwhile, a DCCH null frame with a PCB is transmitted on the forward radio link.

If the received frame is not a null frame in step 4002, which implies that it is a data frame, the BTS analyses all information of the received forward DCCH message and transmits reverse/forward power control information set in the forward message to the power control processor in step 4003-2. That is, the BTS determines the reverse/forward power control information set in the forward message to be reverse/forward power control information for the MS in step 4003-2. Here, data included in Reverse Link Information of the forward DCCH message is transmitted on the forward radio link.

Figure 17A:
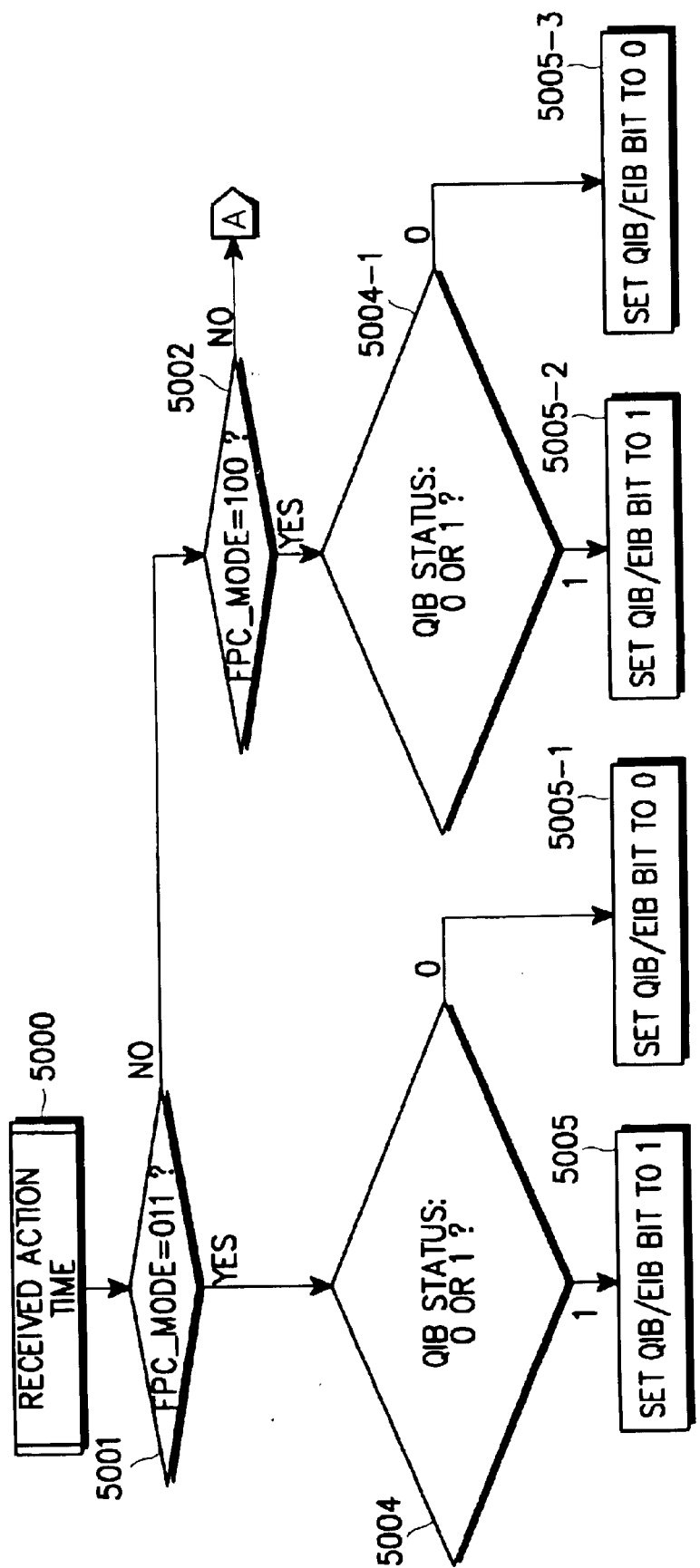
FIGS. 17A and 17B are flowcharts illustrating an operation of setting QIB/EIB for slow forward power control based on QIB/EIB of a reverse pilot channel in the BTS according to the present invention.
Figure 17B:
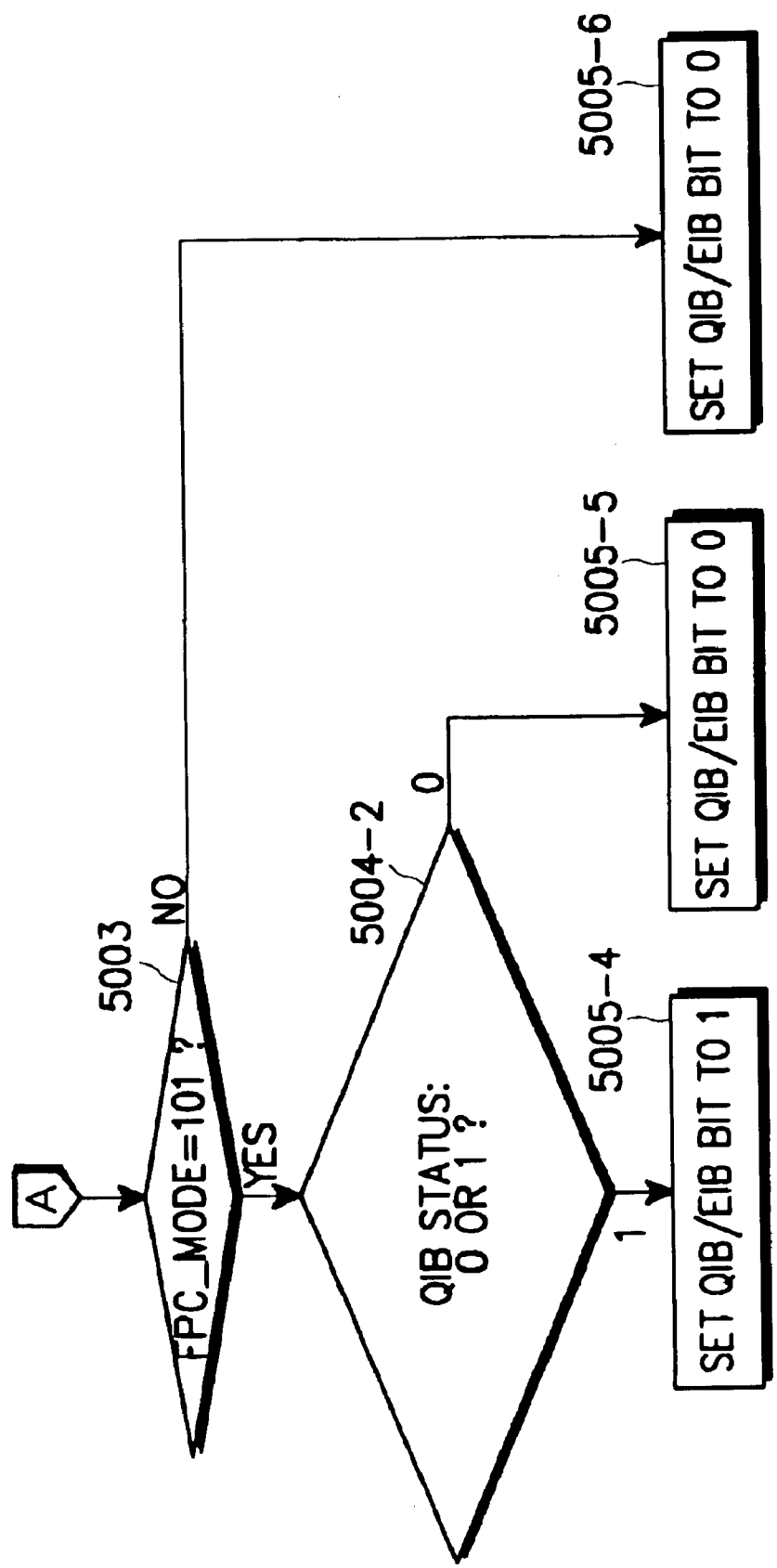

FIGS. 17A and 17B are flowcharts illustrating an operation of processing QIB/EIB of a reverse pilot channel frame received from the MS for slow forward power control on a DCCH according to the present invention. The slow power control is applied, for example, to a DTX period in which a null frame without any real data is received from the MS.

Referring to FIGS. 17A and 17B, the BTS receives a signal indicating the action time of FPC_MODE from the BSC in step 5000 and determines whether FPC_MODE is 011 from the forward DCCH message shown in FIG. 8 in step 5001. If FPC_MODE is 011, the BTS checks the QIB status of the reverse pilot channel every 1.25 ms and determines a final QIB/EIB status of the reverse DCCH message as 0 or 1 in step 5004. If the QIB status is 1, the BTS sets QIB/EIB of a reverse DCCH message directed to the BSC-SDU to 1 in step 5005, and if the QIB status is 0, it sets QIB/EIB of the reverse DCCH message to 0 in step 5005-1.

If FPC_MODE is not 011 in step 5001, the BTS determines whether FPC_MODE is 100 in step 5002. If FPC_MODE is 100, the BTS checks the QIB status of the reverse pilot channel every 1.25 ms and determines a final QIB status as 0 or 1 in step 5004-1. If the QIB status is 1, the BTS sets QIB/EIB of the reverse DCCH message directed to the BSC-SDU to 1 in step 5005-2 and if the QIB status is 0, it sets QIB/EIB of the reverse DCCH message, being transmitted to BSC-SDU, to 0 in step 5005-3.

If FPC_MODE is not 100 in step 5002, the BTS determines whether FPC_MODE is 101 in step 5003 of FIG. 17B. If FPC_MODE is 101, the BTS checks the QIB status of the reverse pilot channel every 1.25 ms and determines a final QIB status as 0 or 1 in step 5004-2. If the QIB status is 1, the BTS sets QIB/EIB of the reverse DCCH message directed to the BSC-SDU to 1 in step 5005-4 and if the QIB status is 0, it sets QIB/EIB of the reverse DCCH message to 0 in step 5005-5. If FPC_MODE is not 101 in step 5003, the BTS sets QIB/EIB of the reverse DCCH message to 0 in step 5005-6.

Figure 18:
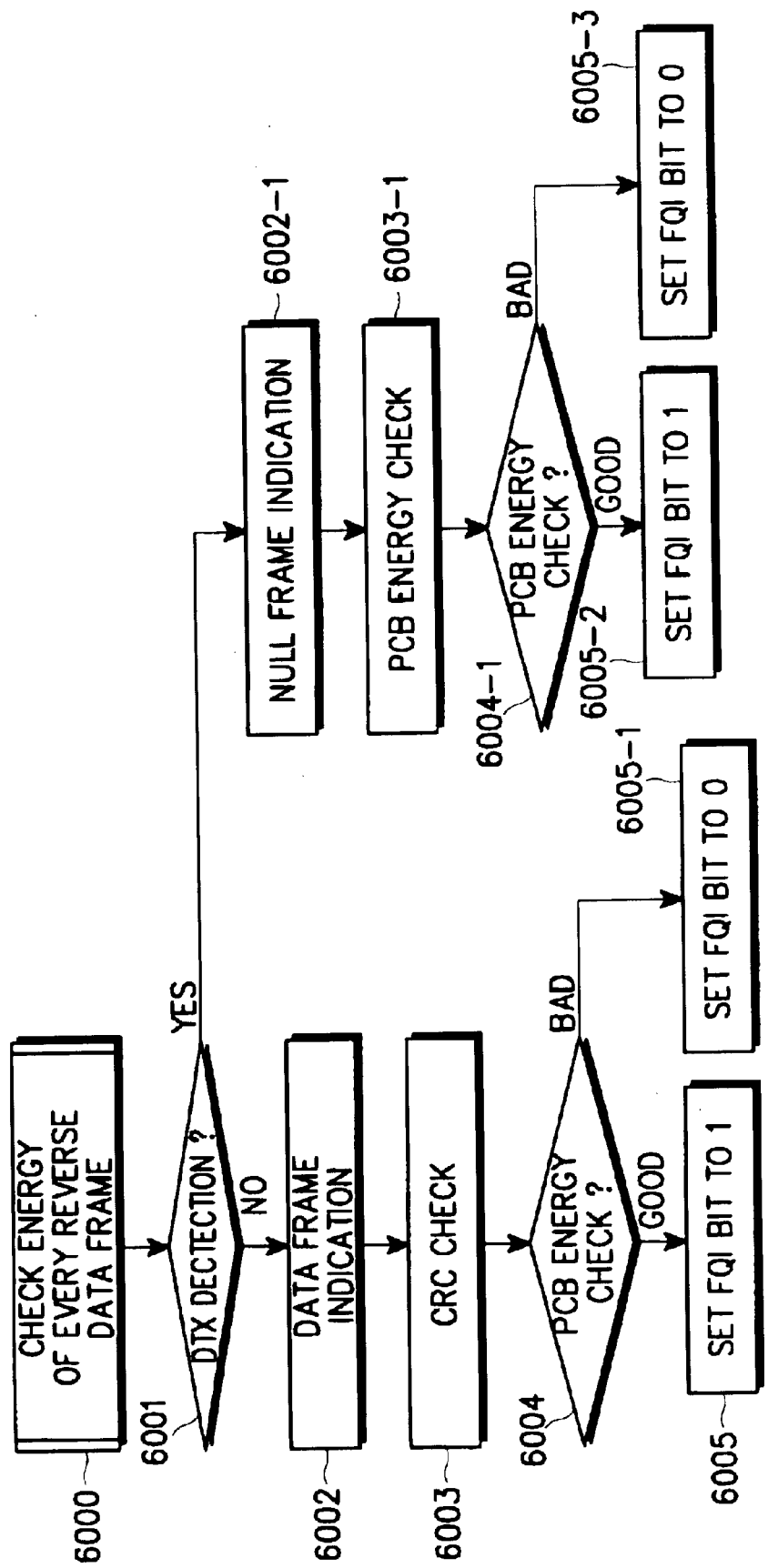
FIG. 18 is a flowchart illustrating a control operation for checking the CRC/signaling quality of a reverse frame according to the present invention.

FIG. 18 is a flowchart illustrating an FQI algorithm in which the quality of a reverse frame (CRC/signaling quality) is checked according to an embodiment of the present invention. Referring to FIG. 18, the BTS checks the energy of every reverse data frame received from the MS in step 6000 and determines whether a DTX mode has been set based on the energy in step 6001. In the case of a non-DTX mode, the BTS sets Frame Content of a reverse FCH/DCCH message to a data frame in step 6002. In step 6003, the BTS performs a CRC check on the data frame, and in step 6004, it determines whether the data frame is good based on the CRC check. If the data frame is good, the BTS sets FQI of the reverse FCH/DCCH message to 1 in step 6005. If the data frame is bad, the BTS sets FQI of the reverse FCH/DCCH message to 0 in step 6005-1.

Figure 19:
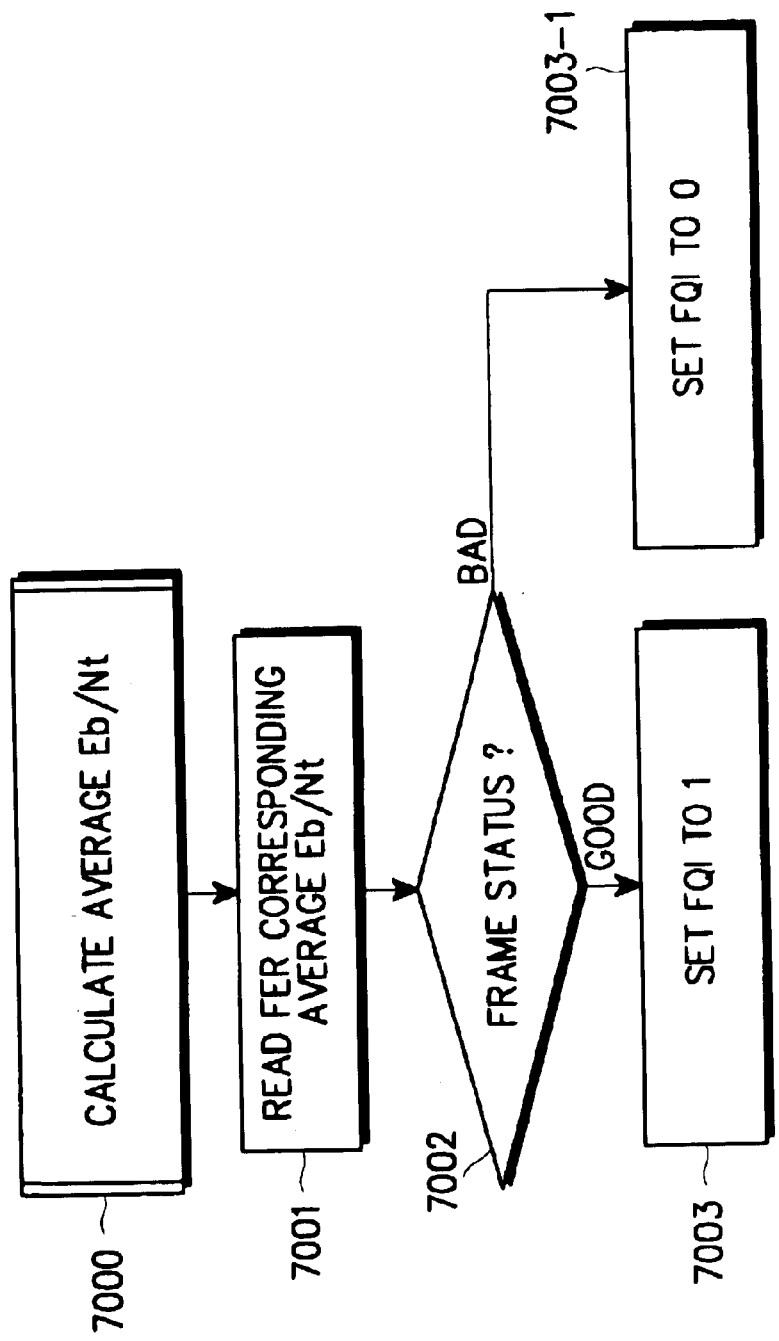
FIG. 19 is a flowchart illustrating an embodiment of an operation of determining a FQI by means of a reverse pilot channel according to the present invention.
Figure 20:
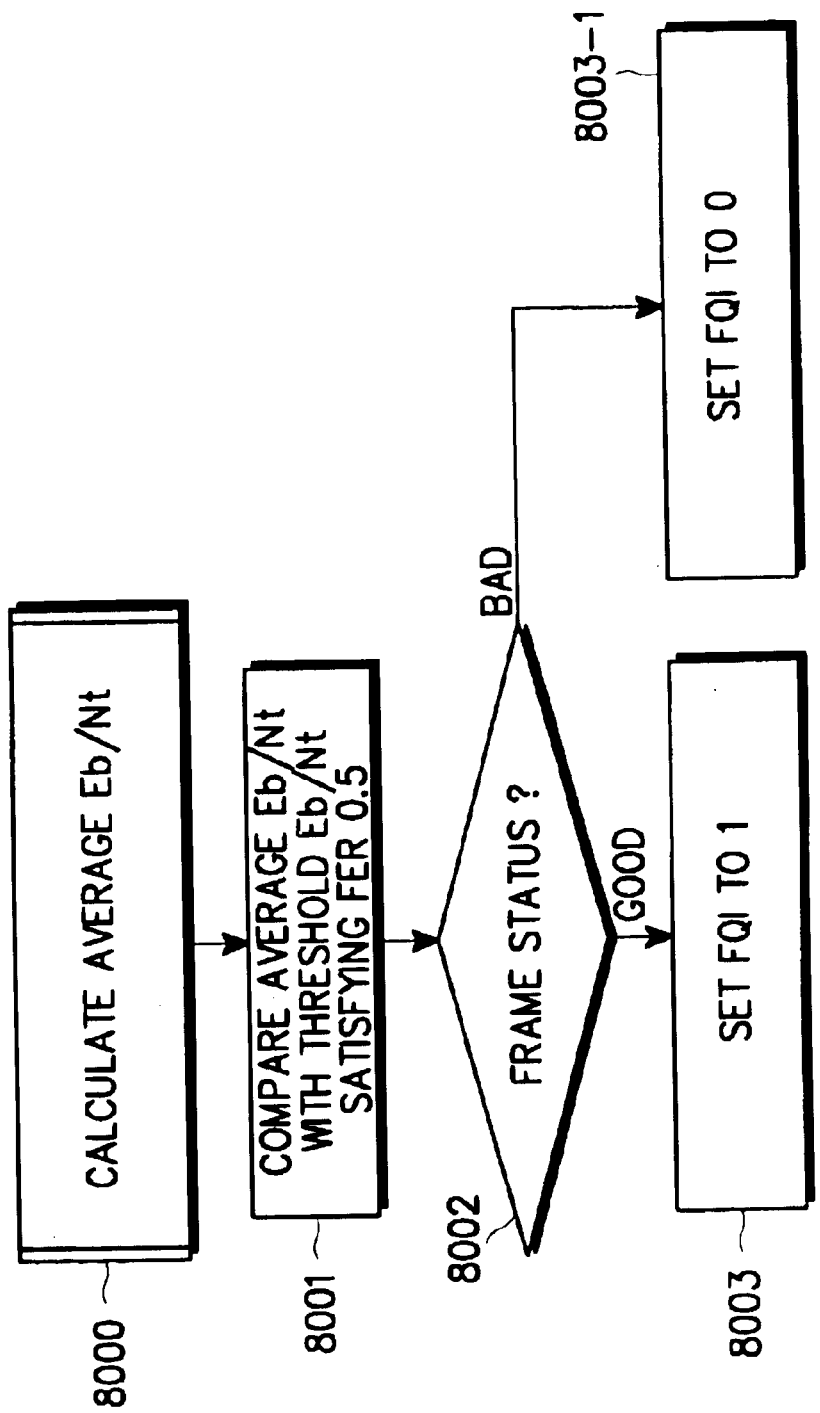
FIG. 20 is a flowchart illustrating another embodiment of the operation of determining a FQI by means of a reverse pilot channel according to the present invention.

In the case of a DTX mode, the BTS sets Frame Content of the reverse FCH/DCCH message to a null frame in step 6002-1 and checks the PCB energy of the reverse pilot channel in step 6003-1 (see FIGS. 19 and 20). In step 6004-1, the BTS determines whether the received frame is good based on the PCB energy. If the frame is good, the BTS sets the FQI to 1 in step 6005-2, and if it is bad, the BTS sets the FQI to 0 in step 6005-3.

FIGS. 19 and 20 are flowcharts illustrating an FQI determination procedure. According to FIGS. 19 and 20, PCB energy in steps 6003-1, 6004-1, 6005-2 and 6005-3 of FIG. 18 is checked and then, FQI bit is determined. Here, FIG. 19 shows an example using a look-up table and FIG. 20 shows another example using a predetermined threshold, respectively according to an embodiment of the present invention.

Referring to FIG. 19, the BTS calculates an average energy Eb/Nt for a 20-ms period by measuring the energy of N PCGs (up to 16 PCGs) in a reverse pilot channel in step 7000. In step 7001, the BTS reads an FER (Frame Error Rate) corresponding to the average Eb/Nt from an Eb/Nt vs FER look-up table. This look-up table is derived from an AWGN performance curve according to preset offset values.

The BTS determines whether frame errors exist or not according to probability in step 7002. That is, the FER read from the table is compared with a random number between 0 and 1 generated with respect to an error rate corresponding to a given FER. If the random number is less than the FER, it is considered that the frame is bad and if the random number is greater than the FER, it is considered that the frame is good. The random number is a general algorithm that allows selecting an arbitrary number between 0 and 1, and for example, a pseudo random number generator may be corresponded. If the frame is good, the BTS sets FQI of the reverse FCH/DCCH message to 1 (good) in step 7003 and if the frame is bad, the BTS sets FQI of the reverse FCH/DCCH message to 0 (good) in step 7003-1.

Referring to FIG. 20, the BTS calculates an average energy Eb/Nt for a 20-ms period by measuring the energy of N PCGs (up to 16 PCGs) in a reverse pilot channel in step 8000. In step 8001, the BTS compares the average Eb/Nt with a given threshold Eb/Nt that satisfies an FER 0.5. The threshold is obtained from an AWGN performance curve according to a preset offset value. The BTS determines whether frame errors exist or not according to the comparison result in step 8002.

That is, if the calculated Eb/Nt is less than the threshold, it is considered that the frame is bad and if the calculated Eb/Nt is greater than the threshold, it is considered that the frame is good. If the frame is good, the BTS sets FQI of the IS-2000 reverse FCH/DCCH message to 1 (good) in step 7003 and if the frame is bad, the BTS sets FQI of the IS-2000 reverse FCH/DCCH message to 0 (good) in step 8003-1.

As described above, the present invention is intended to implement a power control (slow power control) on a DCCH for a DTX period as is done for a non-DTX period. Therefore, the above description is about how to modify the conventional power control for the DTX period and how to utilize an FQI and a QIB for real-time power control for the DTX period.

Table 1 lists transmission rates versus FPC modes. Here, a slow power control is performed at a data rate of 50 bps and a fast power control, at a data rate higher than 50 bps. The slow forward power control is performed when FPC_MODE is 011, 100, or 101 according to the present invention. If this slow forward power control mode is set, an MS transmits a QIB on a reverse pilot channel and a BS (a BTS and a BSC) determines a threshold for the forward power control based on the QIB.

TABLE 1

Transmission rates versus FPC modes.

| FPC_MODE | Primary (FCH, DCCH) power control | Secondary (SCH) power control |
|---|---|---|
| 000 | 800 bps | Not supported |
| 001 | 400 bps | 400 bps |
| 010 | 200 bps | 600 bps |
| 011 | 50 bps | Not supported |
| 100 | 50 bps | Not supported |
| 101 | 50 bps | 50 bps |
| 110 | 400 bps | 50 bps |

In accordance with the present invention as described above, forward/reverse power control on a DCCH is supported for a DTX period with the same effect as for a non-DTX period. Therefore, power control is effectively performed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting power control information to a BSC (Base Station Controller) in a BTS (Base station Transceiver System) of a mobile communication system, comprising the steps of:

receiving forward power control (FPC) mode information indicating a low power control from the BSC and transmitting the FPC mode information to an MS (Mobile Station);

extracting a QIB (Quality Indicator Bit) that is a power control command from a reverse pilot channel received from the MS according to the FPC mode information;

determining the status of the QIB; and transmitting information requesting the BSC to change a threshold for a power control on a forward DCCH (Dedicated Control Channel) based on the determined QIB status to the BSC.

2. The method of claim 1, further comprising the steps of:

receiving FPC mode information indicating a fast power control from the BSC and transmitting the FPC mode information to the MS;

extracting a PCB (Power Control Bit) in every predetermined period from the reverse pilot channel received from the MS according to the FPC mode information; and performing a fast forward power control according to the extracted PCB.

3. A method of transmitting power control information to a BSC in a BTS of a mobile communication system, comprising the steps of:

detecting a DTX (Discontinuous Transmission) period by measuring the energy of a DCCH frame received from an MS;

determining reception status by measuring the energy of a PCB on a reverse pilot channel if the DTX is detected;

determining FQI (Frame Quality Indicator) information according to the determined reception status; and transmitting the FQI information to the BSC.

4. The method of claim 3, wherein the step of determining reception status comprises the steps of:
  comparing the measured energy with a predetermined threshold;
  determining that the reception status is good if the energy is greater than the threshold; and
  determining that the reception status is bad if the energy is less than the threshold.

5. The method of claim 3, wherein the step of determining reception status comprises the steps of:
  determining an FER (Frame Error Rate) corresponding to the measured energy;
  generating a random number in a predetermined range;
  determining that the reception status is good if the random number is greater than the FER; and
  determining that the reception status is bad if the random number is less than the FER.

6. A method of transmitting power control information to a BTS in a BSC of a mobile communication system, comprising the steps of:
  checking FQI information in the latest reverse DCCH message received from the BSC if the frame content of the reverse message indicates a null frame;
  determining a reverse link power control threshold based on the FQI information; and
  transmitting a forward DCCH message with the threshold to the BTS.

7. The method of claim 6, further comprising the step of setting power control information requesting the MS to increase transmission power in the forward DCCH message and transmitting the forward DCCH message to the BTS if the frame content of the reverse message indicates an erasure frame.

8. The method of claim 6, further comprising the step of setting the power control information of the reverse message in the forward DCCH message and transmitting the forward DCCH message to the BTS if the frame content of the reverse message indicates a data frame.

9. The method of claim 6, further comprising the step of setting an initial value for the reverse link power control in the forward DCCH message and transmitting the forward DCCH message to the BTS if the frame content of the reverse message indicates an idle frame.

10. The method of claim 6, further comprising the step of setting information for a slow forward power control in the forward DCCH message and transmitting the forward DCCH message to the BTS if the frame content of the forward DCCH message indicates a null frame.

11. A method of transmitting power control information to a BTS in a BSC of a mobile communication system, comprising the steps of:
  receiving a reverse DCCH message from the BTS;
  extracting QIB information from the reverse DCCH message;
  determining a threshold for a slow forward power control based on the QIB information; and
  transmitting a forward DCCH message including the slow forward power control threshold to the BTS.

12. A method of transmitting power control information to a BSC in a BTS of a mobile communication system, comprising the steps of:
  receiving FPC mode information indicating a slow power control from the BSC and transmitting the FPC mode information to an MS; and
  extracting a QIB that is a power control command in a frame period from a reverse pilot channel received from the MS according to the FPC mode information and transmitting the QIB to the BSC.

13. The method of claim 12, further comprising the step of receiving a threshold for a forward power control that is determined based on the QIB from the BSC.

14. A method of transmitting power control information to a BSC in a BTS of a mobile communication system, comprising the steps of:
  extracting power control information from a radio frame received from an MS according to a set FPC mode;
  performing a fast power control if the extracted power control information is a PCB and resetting a predetermined first field in a reverse DCCH message;
  performing a slow power control if the extracted power control information is a QIB and setting the first field to a QIB status value in the reverse DCCH message;
  setting a predetermined second field in the reverse DCCH message according to the energy measurement of the extracted power control information; and
  transmitting the reverse DCCH message to the BSC.

15. The method of claim 14, wherein the second field is FQI (Frame Quality Indicator) information.

* * * * *